United States Patent [19]

Elgamal

[11] Patent Number: 5,671,279
[45] Date of Patent: Sep. 23, 1997

[54] ELECTRONIC COMMERCE USING A SECURE COURIER SYSTEM

[75] Inventor: Taher Elgamal, Palo Alto, Calif.

[73] Assignee: Netscape Communications Corporation, Mountain View, Calif.

[21] Appl. No.: 555,976

[22] Filed: Nov. 13, 1995

[51] Int. Cl.⁶ .................................................. H04K 1/00
[52] U.S. Cl. ................................ 380/23; 380/25; 380/4; 380/49; 380/29; 380/30
[58] Field of Search ................................ 380/23, 24, 25, 380/4, 3, 49, 29, 30

[56] References Cited

PUBLICATIONS

Linehan & Taudik, IBM Research, Jul., 1995, "Internet Keyed Payments Protocol".
Wired, Oct. 1995, "Scans, Banking with First Virtual".
MacWorld, Nov. 1995, "Money on the Line", p. 114.
Borenstein & Rose, First Virtual Holdings, Oct., 1994, "The application/green-commerce MIME Content-type".
Stein et al., "The Green Commercial Model", Oct., 1994.
"Encryption and Internet Commerce," First Virtual Holdings, Inc., 1995.
Secure Transaction Technology, Version 1.0, "Securing the 'Net".
"Secure Electronic Payment Protocol," Draft Version 1.1, Sep. 29, 1995, MasterCard.

*Primary Examiner*—David C. Cain
*Attorney, Agent, or Firm*—Michael A. Glenn

[57] ABSTRACT

A courier electronic payment system provides customers, merchants, and banks with a secure mechanism for using a public network as a platform for credit card payment services. The system governs the relationship between a Customer, Merchant, and Acquirer Gateway to perform credit card purchases over such networks as the Internet. The system uses a secure connection to simplify the problem of Internet-based financial transactions in accordance with an electronic payment protocol that secures credit card payments and certifies infrastructure that is required to enable all of the parties to participate in the electronic commerce, as well as to provide the necessary formats and interfaces between the different modules and systems.

36 Claims, 3 Drawing Sheets

ELECTRONIC COMMERCE USING A SECURE COURIER SYSTEM

BACKGROUND OF THE INVENTION

1. Technical Field

The invention relates to the processing of commercial transactions. More particularly, the invention relates to the secure processing of on-line commercial transactions.

2. Description of the Prior Art

A fast-growing trend on the Internet is the ordering and provision of information, goods, and services via the World Wide Web, electronic mail, and other means. A key issue for related to such electronic commerce is the authorization and satisfaction of payment for such goods and services in an efficient, reliable, and secure manner. A number of organizations have addressed this issue by establishing proprietary payment systems which vary widely in design, performance, and security features.

See, for example M. Linehan, G. Tsudik, *Internet Keyed Payments Protocol (iKP)*, Internet-Draft <draft-tsudik-ikp-00.txt> (July 1995) (an architecture for secure payments that involves three or more participants in which a base protocol includes a number of options that can be selected to meet varying business or security requirements, for example by applying cryptographic techniques to minimize potential risks concerning payments over the open Internet).

See, also L. Stein, E. Stefferud, N. Borenstein, M. Rose, *The Green Commerce Model*, First Virtual Holdings, Inc., October 1994 (http://www.infohaus.com); N. Borenstein, M. Rose, *The application/green-commerce MIME Content-type*, First Virtual Holdings, Inc., October 1994 (http://www.infohaus.com); and *Encryption and Internet Commerce*, First Virtual Holdings, Inc., 1995 (http://www.infohaus.com); and First Virtual Holdings, Inc., Wired, pp. 51 (October 1995), MacWorld, pp. 114 (November 1995) (an on-line transaction clearing house in which accounts are established off-line via telephone, and in which a transaction requires an account number, where each transaction is confirmed by the clearing house via email); CyberCash, MacWorld, pp. 114 (November 1995) (an electronic payment system that uses cryptography to prevent eavesdroppers from stealing and unscrupulous merchants from overcharging); NetCheque, University of Southern California, MacWorld, pp. 114 (November 1995) (an on-line checking system in which an account holder can send an electronic document that a recipient can deposit electronically into a bank account as a check, where the document contains the name of the payer, financial institution, payer's account number, payee's name, and amount of check, and which includes a digital signature of the payer and which may include a digital signature of a payee); and DigiCash, MacWorld, pp. 114 (November 1995) (an Internet payment systems, referred to as eCash, that provides digital money without an audit trail, thereby protecting the privacy of parties to the transaction).

Additionally, electronic commerce systems have been proposed by Visa International Service Association in collaboration with Microsoft Corporation (Secure Transaction Technology, using digital signature to authenticate a credit card and merchant decal; see http://www.visa.com); and MasterCard (Secure Electronic Payment Protocol, a collection of elements including an authorized holder of a bankcard supported by an issuer and registered to perform electronic commerce, a merchant of goods, services, and/or information who accepts payment from the holder electronically, a MasterCard member financial institution that supports merchants by providing service for processing credit card based transactions, a certificate management system that provides for the creation and distribution of electronic certificates for merchants, financial institutions, and cardholders, and a network to interface the merchants, financial institutions, cardholders, and certificate management system; see http://www.mastercard.com). Payments in the real world are accomplished via such mechanisms as cash, checks, credit and debit cards, money, and postal orders. Electronic equivalents of all these payment systems are being developed. For example, iKP, ibid., addresses a subset of these mechanisms that involve direct payment transfers among accounts maintained by banks and other financial organizations. This includes credit and debit card transactions, as well as electronic check clearing, but excludes electronic cash and money orders because these require very different mechanisms. The stated goal of iKP is to enable Internet-based secure electronic payments while using the existing financial infrastructure for payment authorization and clearance. The intent is to avoid completely, or at least minimize, changes to the existing financial infrastructure outside of the Internet.

Payment systems incorporate tradeoffs among cost, timeliness, efficiency, reliability, risk management, and convenience. For example, some systems attempt to suppress fraud by inducing payment delays. Security in payment systems means minimizing risk to a level acceptable to participants. Risk management in existing systems is accomplished by varying combinations of technology, payment practices, insurance, education, laws, contracts, and enforcement. The state of the art uses cryptographic technology, such as public-key cryptography, to support payments among parties who have no preexisting relationship in a scalable manner.

Many existing cryptographic protocols, such as SSL (K. E. B. Hickman, *The SSL Protocol*, Internet Draft <draft-hickman-netscape-ssl-00.txt>, April 1995), SHTTP (E. Rescorla, A. Schiffman, *The Secure HyperText Transfer Protocol*, Internet Draft <draft-rescorla-shttp-0.txt>, December 1994), PEM (J. Linn, *Privacy Enhancement for Internet Electronic Mail: Part I: Message Encryption and Authentication Procedures*, RFC 1421, February 1993), MOSS (S. Crocker, N. Freed, J. Galvin, *MIME Object Security Services*, Internet Draft <draft-ietf-pem-mime-08.txt>, March 1995), and IPSP (R. Atkinson, *Security Architecture for the Internet Protocol*, Internet Draft <draft-ietf-ipsec-arch-02.txt>, May 1995), provide security functions for pairwise communication. For example, SSL provides privacy and authentication, but no non-repudiation, between clients and servers of application-layer protocols such as HTTP and FTP. Many payment systems involve three or more parties, i.e. buyer, seller, and bank. In such systems, certain types of risk can be ameliorated by sharing sensitive information only among a subset of the parties. For example, credit card fraud can be reduced by transmitting credit card account numbers between buyers and banks without revealing them to sellers.

As the Internet continues to grow, a significant portion of the economy may become inextricably interwoven with Internet-based on-line transactions. It would therefore be advantageous to provide a secure, reliable, and efficient mechanism for implementing transactions associated with on-line commerce.

SUMMARY OF THE INVENTION

A courier electronic payment system provides customers, merchants, and banks with a secure mechanism for using a public network as a platform for credit card payment services. The system governs the relationship between a Customer, Merchant, and Acquirer Gateway to perform credit card purchases over such networks as the Internet. The system uses a secure connection to simplify the problem of Internet-based financial transactions in accordance with an electronic payment protocol that secures credit card payments and certifies infrastructure that is required to enable all of the parties to participate in the electronic commerce, as well as to provide the necessary formats and interfaces between the different modules and systems.

DETAILED DESCRIPTION OF THE INVENTION

The invention herein described implements a secure courier electronic payment system that provides customers, merchants, and banks with a secure mechanism for using a public network as a platform for credit card payment services. The described system governs the relationship between the Customer, Merchant, and Acquiring bank (referred to herein as the Acquirer Gateway) to perform credit card purchases securely over such networks as the Internet. The system uses a secure connection (transport) to simplify the problem of Internet-based financial transactions.

The electronic payment protocol described herein is a three-, four-, or more-way communications protocol. The primary parties are the Customer (buyer), the Merchant (seller), and the payment gateway (representing the Acquiring bank.) The issuing bank's involvement herein is assumed to be through the private networks in use by such bank today. Because such private networks are well understood in the art, the discussion herein does not address issues that are related to having the issuing bank attached to the Internet.

The protocol herein described is used to secure credit card payments and to certify infrastructure that is required to enable all of the parties to participate in the electronic commerce by using the internet, as well as to provide the necessary formats and interfaces between the different modules and systems. The system is designed to use the interactive model of the World Wide Web in common use today for client-server transactions on the Internet. However, the preferred embodiment of the invention is applicable to other delivery mechanisms, such as store-and-forward type mechanisms.

Electronic Commerce Using Credit and Debit Cards

The following discussion outlines the security issues involved in an electronic credit/debit card payment mechanism using the Internet. The security requirements can be divided into two classes:

connection (or channel) security, and payment specific security.

Figure 1:
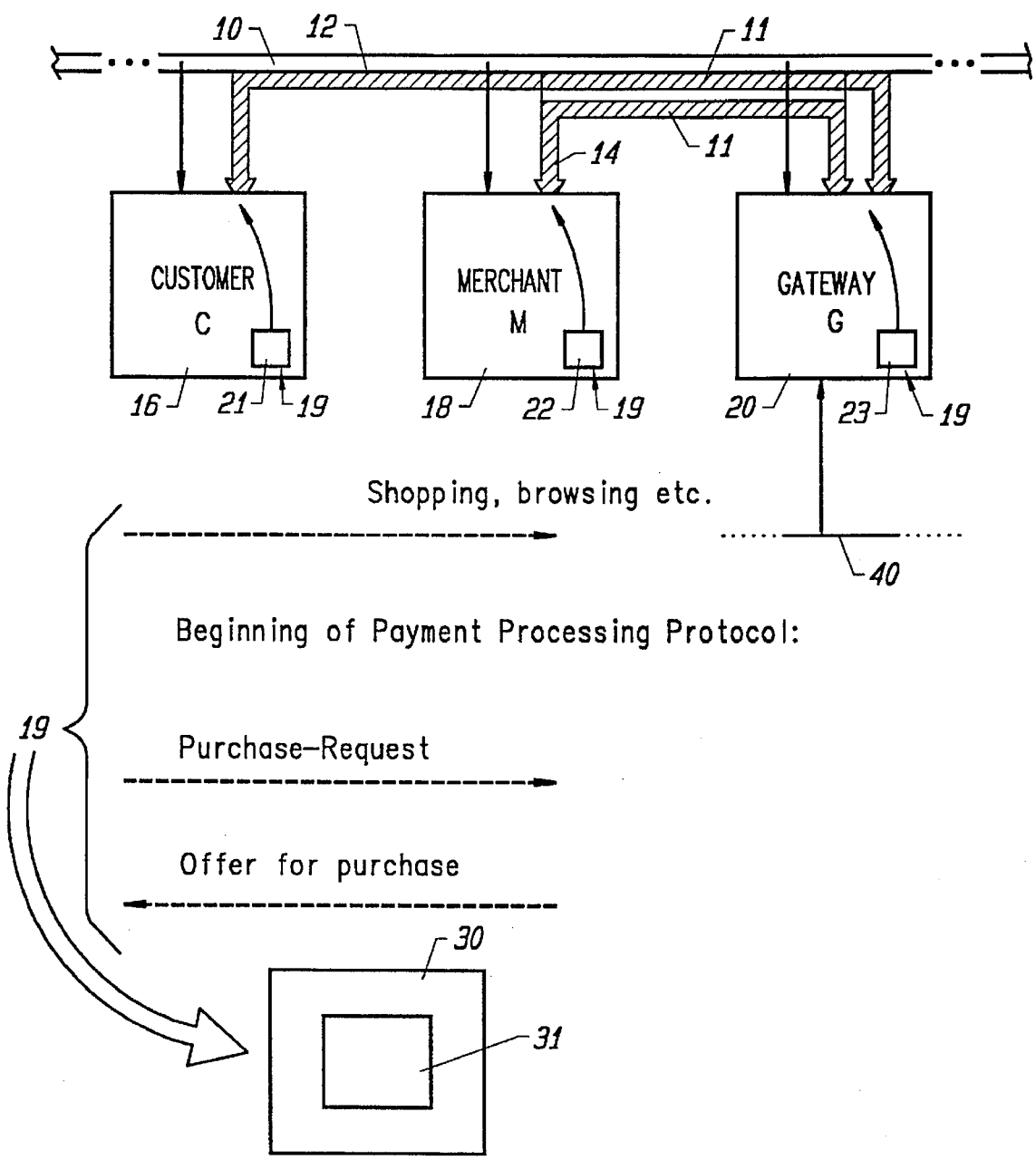
FIG. 1 is a schematic representation of a transaction enterprise including flow diagram showing a payment processing protocol according to the invention.

Channel security can be provided by a secure transport layer (10; FIG. 1), while a higher layer electronic payment protocol (11) is needed to provide such features as signature, non-repudiation, and secondary encryption. The secondary encryption term defines encryption of certain data fields for decryption by a third party, not necessarily the recipient of the entire message. The payment protocol uses two secure channels, one channel between the customer and the merchant, and the other channel between the merchant and the acquirer or payment gateway. However, the payment specific financial messages communicated between the customer and the merchant are protected as part of the payment protocol without assumptions for a secure channel.

The protocol is designed to use an underlying secure transport layer for the following reasons:

Simplify the payment protocol because node-to-node authentication, privacy, and data integrity are automatically achieved by the transport layer. This removes the conditions of guaranteeing message integrity and privacy from the payment protocol.

Separate connection encryption, authentication, and integrity from the payment protocol provides for more flexibility in supporting future secure Internet Protocol (IP) or similar mechanisms.

The secure transport layer supports data privacy and integrity for the communications between any two nodes. This implies that two secure channels are setup, one channel between the customer and the merchant (12; FIG. 1) and the other channel between the merchant and the payment gateway (14). Also, authentication of the appropriate nodes is a function of the secure transport. In particular, the payment protocol assumes the following properties of the underlying secure transport:

Privacy

All channel communications between any two nodes in the system should be encrypted. This guards against any network snooping and does not give any information to possible attackers.

Authentication

There are two distinct forms of authentication that need to be addressed:

First, all merchants and acquirers should be authenticated to each other and to customers. Customer authentication is supported as an option.

Second, support for signature for proof of authorship and receipt for non-repudiation purposes may be necessary for some applications.

The first form of authentication can be achieved by a reliable secure transport mechanism. The second form must access the fields and values that need to be signed, and therefore should be performed in the application.

Data Integrity

Integrity is maintained at all times using a keyed message digest computation. This should be a part of the channel security mechanism. An extra layer of integrity is added to the message level using a hash of each message to avoid early termination type attacks, and to make sure that the messages arrive at the recipient unaltered.

The payment protocol, on the other hand, is concerned with payment specific issues. These issues are outlined below:

Confidentiality of the credit card number, PIN, and other customer information. These items are kept encrypted with regard to all parties, including the merchant handling the transaction.

Confidentiality of the specific order information from all parties other than the Merchant. This includes, for example the acquiring and issuing banks.

Digital signatures on the various messages communicated between the different parties to ensure authorship. It is important to point out that this is different from node authentication because, in several cases, message authorship proof is needed between two parties that are not directly communicating with each other.

Notation

K{value}=value encrypted under K using a symmetric-key algorithm.

PKx{key}=key encrypted under the Public Key (PK) for x using a public-key algorithm, where x can be C for customer, M for Merchant or A for Acquirer.

E{value}=encryption of value under a data encryption key that is encrypted under the public key of the recipient. This construction is commonly referred to as a digital envelope.

H(value)=The message digest of value using a negotiated message digest algorithm.

Cx, CERTx=The certificate of entity x.

Sx(Value)=The value combined with the digital signature of the entity x using its private key. The signature could be verified using the public key PKx from the certificate Cx. If entity x does not have a public-private key-pair, then a low grade signature can be generated using a hash of the Value with some information from x, for example a credit card number, some personal information about x, such as social security number, billing address information, or a PIN.

The protocol description herein applies to any account based payment mechanism, with an emphasis on credit cards. Thus, the basic protocol also applies to other payment methods.

Interactive Vs. Store-and-Forward Design Methodologies

The system described herein uses the advantages that an interactive environment provides to the customer and merchant. However, the basic scheme is usable for a store and forward mechanisms as well. An interactive environment, such as available using the World Wide Web, provides all parties with an immediate response that indicates the status of the messages communicated. An immediate acknowledge for the delivery of a payment message, for example, provides the customer with feedback as to the status of an order. Such facility is not available with a store-and-forward environment. It is considered important for a successful system to support state of the art mechanisms, such as the World Wide Web, because such system provides the user with an immediate feedback as to the status of the order, somewhat similar to a customer in the store payment model.

Protocol Design Requirements

The following discussion describes the requirements that the electronic payment system has to satisfy to meet the Business requirements of electronic commerce. There are different requirements for each of the entities involved. The following sections describe the requirements of the payment protocol applications. The protocol presented herein is similar to systems proposed by several other protocols from other vendors (see the discussion above), but supports a complete suite of credit/debit card transactions and uses a secure transport layer. The intention is to provide an efficient, secure protocol for processing payment transactions that is readily adopted by merchants and financial institutions.

In general, the protocol also includes an acknowledge for each message to provide the message sender with feedback as to the status of the message. Thus, the sender is expected to resend a message if an acknowledge is not received within a specified period of time.

The Customer Application (16; FIG. 1).

The customer possesses the following information:

Personal Account (Credit Card) Number (PAN), billing address information, PIN for various accounts, and any other confidential information that may be required for authorization purposes.

Name and shipping address information.

Optionally, one or more digital certificates.

A connection to a network, such as an interactive (World Wide Web for example) connection can exploit all of the features of the herein described system.

Customer Requirements

Unauthorized entities should not have any access to transactions on the wire.

The credit card information can be hidden from the merchant to prevent attacks on the Merchant's server by hackers on the Internet, as well as to prevent unauthorized charges by Merchants.

Optional receipts signed by the merchant to allow the customer to obtain proof of the transaction.

Prevention of unauthorized transactions, such as transaction replays by an attacker, modified transactions, or fake transactions.

The customer application implements all of the browsing and shopping functions, as well as generating Purchase Orders, payment information (PI), and signatures for transactions. Additional functions needed to support electronic credit card transactions are listed below:

Receive price and product information from the merchant and encrypt the transaction ID supplied from the merchant with the credit card number or other financial information. This information is made accessible to the acquirer only using the acquirer's public-key, which is extracted from the acquirer digital certificate.

Verify signatures from the merchant to ensure the origination of messages. Make sure the Order as supplied in the receipt matches the original order generated by the customer earlier.

Generate signatures on payment messages using an optional public key certificate.

The Merchant application (18; FIG. 1)

The Merchant possesses the following information:

Merchant ID number (MID) assigned by the acquirer to each Merchant. These MIDs may be globally unique or unique to a specific acquirer, depending on the implementation.

Merchant name and address.

Merchant digital certificate(s).

Name and information about the Merchant's Acquirer(s), including the Acquirer's financial certificate and information about how to communicate with the Acquirer's Gateway.

A database of all open transactions with corresponding Transaction IDs and AuthIDs with customer information.

Merchant Requirements

Efficient and automated operation of payment authorization and capture through the Internet or using existing internal capture systems.

Authenticated (signed) authorization and capture responses from the acquirer.

The Merchant's application provides all the server functions for the customers to obtain product information and pricing. It also serves as an intermediate between the customer and the acquirer. The merchant application should also include the following to allow performance of credit card transactions:

Generate a transaction ID for each customer order. The transaction IDs are generated sequentially and used only once. The transaction ID is used to track an order until it has been authorized by the acquirer.

Verify the acquirer signature on capture responses and the customer signature on receipts.

Generate receipts for customer signature optionally.

Generate digests of order information for the acquirer to verify authenticity of the purchase order.

The Acquirer (Gateway) Application (20; FIG. 1)

The Acquirer possesses the following information:

Acquirer name and address.

Acquirer digital certificate.

Names and information, including certificates, about the Merchants that are signed up with the Acquirer. This can be implemented as a database of merchants stored encrypted on the gateway machine.

A table with each merchant's current open Transaction IDs and corresponding AuthIDs tagged with each merchant's MID.

Acquirer's Requirements

Support for different methods of managing transactions, one time, recurring, and partial shipment included.

Authenticated transactions by signed-up merchants.

The acquirer application is typically an addition to a set of products that are needed to complete financial transactions over the Internet. The acquirer application performs the following functions:

Receive order amount and Transaction ID with customer financial information and perform credit card authorizations.

Receive capture requests and perform capture confirmation.

Translate a standard message format from the Merchant into the proper formats used by the existing authorization network (40; FIG. 1).

The Credit Card Based Electronic Commerce Payment Protocol

Message Definitions

This following discussion outlines and defines all the needed quantities and message components for the messages used in the payment protocol:

PAN: The personal account number for the card holder. Normally this is a credit card number.

Expiration Date: The 5 digit expiration date of the card.

Merchant ID: A unique number for each merchant assigned by the acquirer signing up the merchant. The merchant ID is unique for each acquirer, and thus includes the acquirer ID as part of it to generate a globally unique number. The acquirer ID is assigned by the card associations and is not transmitted alone as part of this system.

Transaction ID: A unique number assigned by the merchant for each transaction. The merchant and the card holder can use this number in conjunction with the merchant ID to identify any particular transaction.

Acquirer Certificate

Merchant Certificate

Total Amount

H(Order)

PIN

Billing address

Shipping Address

Resp-Code: Response code from the authentication process.

Auth-Code: A 6-digit number returned by the banking network to use for clearing/capture steps.

Icdata

CaptureResp: A response for the capture process.

Validity Period: Start and expiration dates for a message.

Date: Date and time stamp.

Digital Signature: A digital signature as defined in this document comprise the following:

SIGNx(data)=Sx(data, nonce, date), nonce, date, signer's certificate.

The above format ensures that all signatures are fresh and dated. Providing the certificates with the signatures simplifies the exchange of the certificates.

Message Flow and Definition

The protocol described below assumes that merchants and credit card acquirers possess digital certificates. The client (customer) may possess one or more digital certificates as an option.

The protocol divides the needed operations into a set of basic protocols that are described first. The following discussion describes how each type of financial transaction is accomplished. All protocols support full privacy, authentication, non-repudiation, and integrity. The underlying Session layer provides all connection security functions, e.g. privacy, authentication, and integrity, from the channel's point of view. Any document or field (data element) level security operations are preferably performed at the application level.

The contents of each message depend on the actual operation (purchase, return, etc. . . . ) performed. Therefore, these contents are discussed under each operation section below.

The protocols outlined below start as the customer is ready to purchase some items from the merchant using a credit card. It is assumed that the customer is already finished with his shopping and has made the decision to purchase something.

The customer sends a message (19; FIG. 1) to the merchant requesting a price quote for the items of choice before the payment instruction message start.

The Date and Time fields in all the following messages are newly attached by the node creating the message. This allows the different entities to get higher assurance about the freshness of the transaction.

The Capture and settlement groups described below can replace modern methods, that use lease lines or private networks, without disrupting the protocol. This enables different acquirers to implement portions of the protocol in steps, while maintaining backwards compatibility with existing systems throughout the phase-in process. Initial implementations do not have to implement those sections.

Each Secure Courier message 19 includes two parts:

the message wrapper (30; FIG. 1), and the message body (31; FIG. 1).

The contents of the message body of each message are described below. The message wrapper consists of the following elements:

Order Number, and routing information.

Each of the messages below consists of two parts. The forward part is described in detail for each message, while an optional acknowledge is generated by the recipient and sent to the sender to ensure the receipt of the message. The acknowledge is a hash of the message, which actually proves the receipt by the appropriate recipient because of the use of the SSL layer that guarantees an authenticated channel. The time of receipt is concatenated to the hash and the concatenated message is used as an acknowledge.

In addition, each message is considered to be expired if it is received after the message's validity period is over.

To authenticate further the acknowledge messages, a digital signature can be used instead of a hash and the time stamp. If the original message has expired, then a denial is received instead and the sender is asked to repeat the operation.

Figure 2:
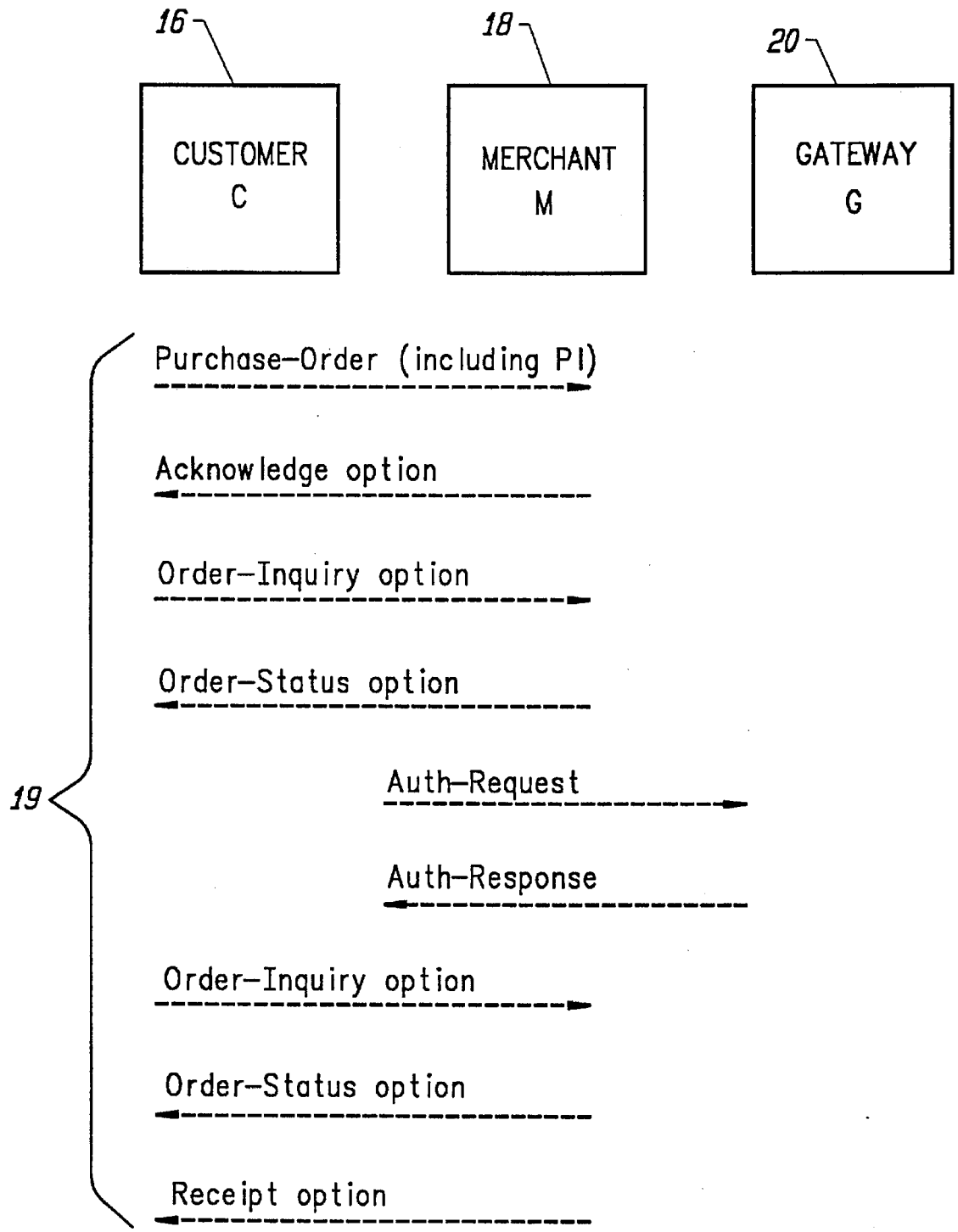
FIG. 2 is a flow diagram showing a transaction according to the invention.
Figure 3:
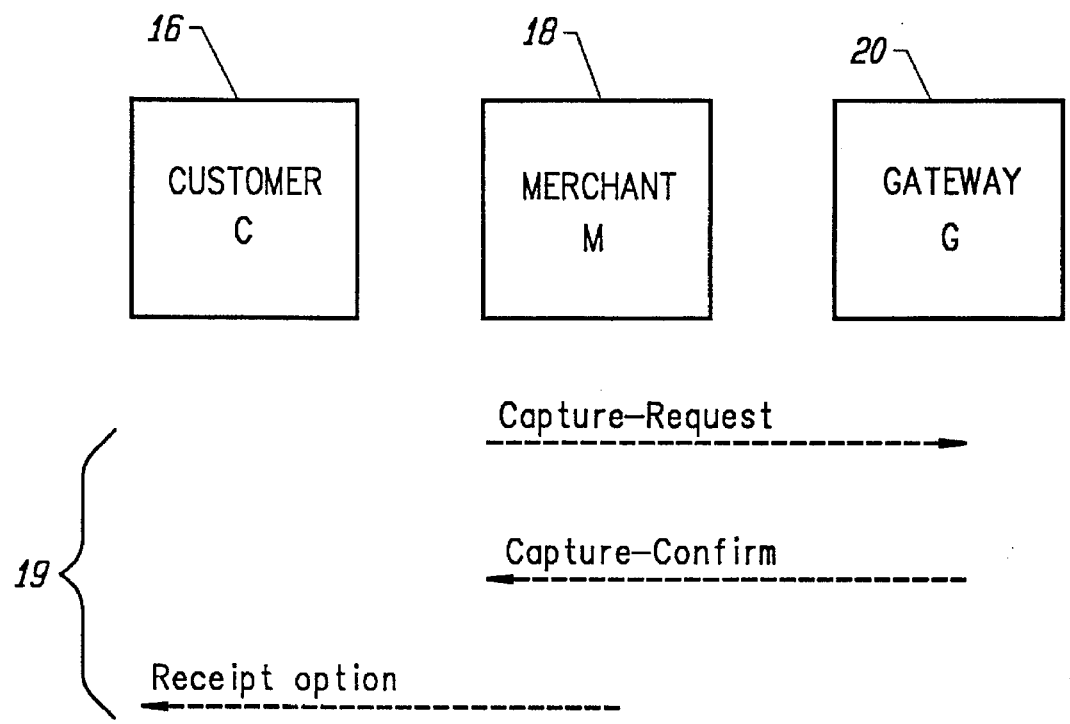
FIG. 3 is a flow diagram showing a capture protocol according to the invention.

In an authorization group (see FIG. 1) consisting of a customer C, a merchant M, and a Gateway G, a transaction (FIGS. 2 and 3) that includes the Purchase-Order, Payment Instruction (PI) message below causes the Merchant to respond with:

$$S_M(H(\text{Purchase-Order, PI}), \text{Date, Time}) \quad (1)$$

The Offer preferably has an expiration date beyond which the Merchant cannot guarantee the price quoted or the availability of the goods.

Due to the use of a secure transport layer, the Transaction ID (TxID) is used for book keeping purposes and optionally to prevent Merchants from replaying authorization requests. It is assumed that merchants have signed up with this service and that they are trusted to some extent. The PI value should be encrypted so that the Merchant's server, e.g. on the Internet, does not have any clear credit card numbers that can be accessed remotely.

The TxID is combined with the credit card information and encrypted in the PI message. This ensures that each message is different if the Merchant uses a unique TxID for each transaction. It may be difficult for the Gateway to track the sequence numbers for the TxIDs issued by any particular Merchant because they arrive out of sequence, in general, depending on the customer's response time to the Offer from the merchant prior to the beginning of the payment protocol. The Purchase-Order should be received by the Merchant prior to the expiration time of the Offer.

Messages can include a hash of all the message parts to add a level of integrity at the application level. This provides the recipient of a message with an extra degree of confidence that the complete unaltered message has been received. This hash can be included as part of a Secure Courier Message Wrapper that is described below.

A receipt is then issued at this stage if the authorization request was combined with a Capture operation.

The data needed by the client before the payment protocol starts are described below as part of the Offer message. These are usually communicated at the final stage of the shopping and negotiation stages.

Offer: M→C
  SIGNM(Validity Period, Items, Payment Method, zip code or country (for shipping charges computation), Amount, Currency, Merchant ID (MID), Acquirer's certificate (CERTA), and transaction ID (TxID)).
The message is signed by the Merchant.
The Purchase-Order and the Payment Instruction messages below are sent together from the Card Holder to the Merchant.
Purchase-Order: C→M
  Name, Validity Period, Items, Total Amount, Currency, Merchant ID (MID), transaction ID (TxID), and shipping address.

PI: C→M
  The PI message is a signed message from the Card Holder using the Slip described below.
Slip
  Version, current date, expiration date (Validity Period), Total Amount, Currency, Orderhash, MerAcqHash, Credit Card information (CardInfo).
where:
  Order=Hash of the order description including any salt for minimizing attacks on the hash.
  MerAcqhash=hash of the merchant ID, transaction ID and other merchant or acquirer data. This data is specific to the merchant-acquirer pair and is not needed by the buyer other than for inclusion in the PI message.
  CardInfo=(Personal account number (PAN, expiration date, other optional information that may be needed by the payment processor/acquirer.

The PI is preferably sent encrypted to the Acquirer using the Acquirer's public key. In some cases, due to certain Merchant - Acquirer relationships, the PI may be sent in the clear. It is always recommended to encrypt the PI message using the following digital envelope construction.

$$E(\text{Slip})=PKA\{\text{DES key K}\}, K(\text{Slip}) \quad (2)$$

The final message sent is formatted as follows:

$$PI=SIGNA(E(\text{Slip})) \quad (3)$$

where the SIGN operation is defined as above.

It may be necessary to send the PI without encryption in case of a merchant that performs the capture process independently. This is reflected in a capability field in the merchant certificate that instructs the acquirer software to send the credit card information back to the merchant. As discussed above, the data on the channel are encrypted by the secure transport, and the Merchant is the only entity that may receive the clear PI data from the acquirer. Normally, a merchant with a good history could be considered trustworthy and can obtain clear account numbers from the acquirer.

The PI can be sent in several forms using, for example the PACs #7 formats. These formats include: (unencrypted) content, encrypted, signed, enveloped, and signed and enveloped. The choice depends on the capabilities of the user and the navigator configurations. The payment gateway can decode any of these formats using the PACS handler. The recommended choice is the enveloped format described above.

Order-Inquiry: C→M
  Date, (order number or MID, TxID), Orderhash. A hash of all previous components is added. Orderhash is the hash of the Purchase-Order and is used by the gateway to compare with the Orderhash value computed by the Merchant to verify the correctness of the Purchase-Order without actually having access to the details of the order.
This message is sent by the customer to the Merchant, at any time, to request the current status of the order. The possible responses are:
  Order-Acknowledged;
  Authorization-completed;
  Goods-Shipped; or
  Account-Billed.

These responses are communicated to the customer using the Order-Status message.

Order-Status: M→C (Resp-Code, Auth-Code translated to language that the user can understand), Date, Time, (Order number or MID, TxID), Orderhash.

The Order-Status provides an acknowledge for the Order-Inquiry message. This message is implemented to provide the customer with a status on the order. Resp-Code and Auth-Code may be translated to the customer to understand the exact status of the order as listed in the Order-Inquiry above.

Auth-Request: M→G

SIGNM(MerchantInfo including MID, TxID, Validity Period, Total Amount, Orderhash, Auth-Capture, PI, payment method, batch sequence, optional invoice.)

Auth-Response: G→M

SA(Auth-Code, Date, Time, Current Amount, Orderhash, MID, TxID, optional PI for Capture through a different site). The Auth-Response also provides an acknowledge for the Auth-Request message.

Auth-Capture is a flag which is set if the Merchant is Capture the transaction at the time of authorization. Auth-Code is used as a transaction identifier for the above Order-Inquiry and Order-Status messages. The Acquirer's signature is attached in the case the Merchant needs to prove that the authentication response actually came from the Acquirer.

Receipt: M→C

SM (CaptureResp, Auth-Code, Validity Period, MID, TxID, amount, Order)

The receipt guarantees the Customer that the Merchant has committed to shipping the goods at the prices quoted and that the payment has been authorized by the bank. The acquirer signature is optional and depends on the particular rules set for electronic commerce.

The Receipt transaction can be implemented using a notification message, for example using an email message from the Merchant to the Customer, to retrieve the receipt information from a particular location on the Merchant's server.

Capture Group

A separate Capture transaction is necessary for the cases that require delayed time for payment from the authorization such as hotel and car rental transactions. It is also necessary when a customer's signature on a transaction receipt is required. Therefore, the protocol always assumes a separate capture transaction from the Merchant to the Gateway (see FIG. 1).

Figure 4:
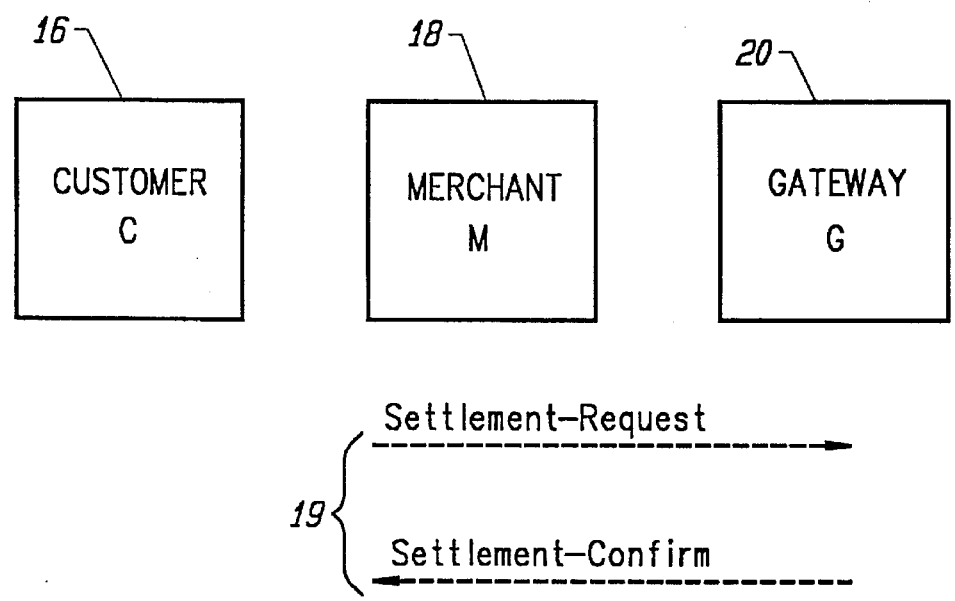
FIG. 4 is a flow diagram showing a settlement protocol according to the invention.

This portion of the protocol starts when the merchant is ready to ship the merchandise and/or charge the customer (see FIG. 4).

Capture-Request: M→G

Auth-Code, Validity Period, Orderhash, amount, MID, TxID, E(PI).

A Capture request does not suffer from a replay attack as with an authorization request because a capture request is attached to a particular AuthID that can only be exercised once.

Capture-Response: G→M

CaptureResp, Validity Period, Orderhash, amount, MID, TxID.

The message is signed by the acquirer as an acknowledge of the Capture-Request message.

The returned CaptureResp=−1 if unsuccessful, successful if any other value is returned.

Settlement and batch processing

It is expected that settlement may be performed in a variety of ways that may not involve the Internet. See FIGS. 1 and 5 in connection with the following.

Settlement-Request:

TotalAmount, MID, Date.

Settlement-Confirm:

SettlementCode, Action.

SettlementCode=−1 if the amount reported by the Merchant is not valid, valid otherwise. If −1 is returned, then the Merchant sends all AuthIDs with amount to the Acquirer until the difference is reconciled. Different policies may be applied by different acquirers to resolve these situations.

An Open-Batch message can be used by the Merchant to precede all Capture requests. A Close-Batch has to be sent at the end of the batch. More details on the batch processing features of Secure Courier are provided below.

Error Recovery

The following discussion addresses issues related to recovery from error conditions, generally from messages that have not been correctly delivered. Each portion of the protocol assumes that the previous sequence of messages have been completed and reached the intended recipients.

Error recovery is achieved by a two step process:

In the first step, the sender of a message repeats the message if an acknowledge is not received. There are two cases to be considered here:

if the original message was actually received then the recipient repeats sending the acknowledge, otherwise the message is considered as new by the recipient and the appropriate action is taken.

The second step occurs when an acknowledge is not received after the message has expired. In this case, the transaction that generated the message has to be restarted.

Examples of error recovery are presented below. More details on error recovery for each of the Secure Courier message step are set forth below.

Errors in the Authorization Process

If the Auth-Response is not received by the merchant within a certain time frame, the Merchant repeats the process by sending the Auth-Request again if it has not expired yet. The Gateway responds with an Auth-Response. If the original Auth-Request was not received by the Gateway, then the message is sent to the bank. Otherwise, if this is a repeated message, only an Auth-Response is sent to the Merchant. If the original Auth-Request has expired, then the Merchant should consider the transaction invalid and should reissue the Offer with a new TxID. The same TxID should not be used more than once. A message to the gateway indicating that action may need to be sent.

Errors in the Capture Process

The same system works here as described above for the Authorization phase. If the Capture-Request message has expired and the Capture-Confirm does not reach the Merchant within a reasonable period of time, then the transaction should be considered invalid and the complete transaction sequence should be redone.

Errors in Receipt Delivery

If the Signed-Receipt message does reach the Merchant within a reasonable period of time, then another Receipt is sent. It the Receipt message has expired, then the transaction should be reversed, using another sequence of steps with a negative amount. This is only done if a receipt is mandatory according to the implementation.

Purchasing

The following discussion describes the purchasing process. Two different scenarios are possible, one for immediately delivered products and the other for delayed delivery.

Immediate Delivery of Goods

There is no differentiation here between immediate or delayed delivery to simplify the protocol. The Capture messages are separate from the Auth messages to enable the protocol to support all types of goods delivery.

The customer finishes shopping and browsing the merchant's mall, news-stand, or cyber store. A collection of items are kept in a shopping cart for price quotes. Once the customer chooses the payment option, a secure transport channel is established and the nodes exchange certificates. These certificates are made available to the payment protocol layers.

The customer sends the list of items to purchase to the merchant, including the type of payment method. The customer's application needs to specify which type of credit card is used to allow the merchant to supply the correct Acquirer's certificate. The merchant replies by sending an Offer message, including price quotes. A transaction ID sequence number is issued to the customer.

The customer's application prepares the Purchase-Order and PI messages using a credit card number. The merchant's application includes a time out mechanism to define an interval within which the customer must reply, otherwise the offer is invalid and the transaction ID may be reused. This is done to protect special prices that the merchant establishes for limited periods of time. The merchant receives the Order and E(Pi), prepares the H(Order) message, and sends to the Acquirer with the PI for authorization. The Auth-Request may cause an immediate Capture transaction if the Merchant is ready to ship the merchandise at Auth time, or if a debit card transaction is being performed.

The Acquirer checks the correctness Of the Order and PI fields and performs an authorization for the required amount. If successful, the Acquirer returns a signed message that includes the Authorization ID. If not successful, a denial code is sent. In any case, the merchant's transaction ID is incremented.

The merchant receives the authorization ID that may be forwarded to the Customer for proof of authorization. For immediate delivery, the goods are shipped and the funds are transferred between accounts using the banks network. The merchant sends a settlement message at the end of the day using a settlement request message.

Delayed Delivery of Goods

In the case where the merchant has to ship the goods at a later time, the following scenario is used:

After the initial steps are completed, the authorization request (with no Capture option) is sent to the gateway. The sequence of Capture messages are sent to the gateway only when the merchant is ready to ship the product. The remainder of the protocol is the same as described above for the immediate delivery of goods case.

Subscription-Based Payments

In some cases, the merchant is allowed to periodically, e.g. every month, send authorization requests based on an agreement with the customer at the beginning of the subscription period. In this case, the merchant can request the customer to send multiple PIs with the Purchase-Order and submit each PI at the time of each installment. Alternatively, this can be done using the unencrypted PI in the above protocol so that the merchant can produce all the needed components. The merchant has access to the clear credit card information.

Partial Shipments

The case of a partial shipment is somewhat similar to the subscription based payment, except that the merchant may not now ahead of time when certain merchandise is available. In this case, the merchant should actually perform a separate authorization for each partially shipped portion of the order. This can either be performed by sending the Auth-Request message for each partial shipment, or by performing multiple Capture-Requests for a single Auth-Request. This is typically dictated by the Acquirer's software capabilities, which differs greatly between acquirers.

Returns

The following discussion describes the process of returning merchandise. Each merchant needs to establish a return policy because some merchandise can be non-returnable. If the customer is to return the merchandise, the following sequence of messages is performed:

The customer presents the merchant with returned merchandise and is asked to present the credit card electronically. The merchant sends an Offer message to the customer with a negative amount representing a return. The customer's application computes and sends a Purchase-Order, including the Payment Instruction PI message with negative amounts. The merchant sends a capture request message with the negative amount and the customer's account is credited if the transaction is verified to be authentic. The acquirer keeps records of transactions to verify authenticity of return transactions. The Gateway communicates the Acquirer's decision regarding the return back to the Merchant. The merchant signs all capture requests to prevent customers from fraudulent returns.

Disputes and Charge-Backs

The following discussion describes the process of disputing charges. Electronic authorization and receipts reduce the risk of mischarging a card. However, under some circumstances, a customer may dispute a particular charge and can request a refund. A signed receipt from the customer could be grounds for denying the refund, but some acquirer-merchant pairs do not require receipts. A charge dispute may be resolved using the following sequence:

The customer usually communicates directly with the card issuer in the case that they have been over charged or erroneously charged. All parties reproduce the applicable signatures on the messages throughout the transaction for the Acquirer to be able to settle the dispute.

Enhancements

The Gateway may possess several certificates for communicating with different Merchants and for different purposes. This can help hide the identity of the payment processor, if required. Also, different certificates for signatures and encryption may be used for export compliance purposes.

A single digital signature may be generated by any entity for multiple messages by concatenating the hashes of multiple messages and then signing the entire combined hash. This proves that all messages have been received. For example, the Merchant may combine many Hashes from many customers and provide one signature. This improves the performance because the signing process is the most expensive operation in the entire protocol.

Export Control

The export issues with the use of cryptography in commercial systems is of particular importance with financial transactions on public networks. The following discussion describes the different issues and requirements of international financial applications across public networks. In general, RSA and DES have been approved for export and used for authentication and encryption of financial data purposes, respectively.

Selective Strong Encryption for Financial Data

The data communicated between the different nodes on the Internet include a variety of sensitive financial information, as well as other product and order information. It may be acceptable to encrypt the bulk of the data using one of the algorithms currently approved for export, however, the financial data should be protected at an acceptable level for the banking industry regardless of the geographical location. This may also be implemented on top of the bulk encryption for other data streams or as a replacement for the underneath bulk encryption.

Third-Party (Secondary) Encryption for Selected Data

There is a need within a message to encrypt information that is intended for a secondary node. For example, encrypting the credit card information to a service provider embedded in a message sent to a merchant. A preferred way of achieving this functionality is to apply encryption at two different layers of the Internet network model. An individual field encryption can be accomplished at an application layer, while the channel encryption can still be applied to the entire record that the socket layer receives.

Strong Merchant and Acquirer Certificate for Signature Computation

The following is a list of digital certificates used for multiple purposes in a commercial application over the Internet:

Authenticating the channel between a client and a server.

Encrypting data from one node to another through other nodes. Typically the DES keys are encrypted using the recipient's public key and the bulk data is encrypted Using the DES keys to form a digital envelope.

Signing a message or a receipt for non-repudiation.

It is clear that the last item above requires a certificate with a larger key size for non-repudiation, the first two items could be relaxed for export purposes since they could be changed periodically. This does introduce a synchronization problem in distributing and using certificates. One solution provides for the acquirer/issuer bank to issue digital certificates that overlap in their validity periods. During this period the use of either certificate makes for a valid signature. In fact, the acquirer's financial certificate system is designed to be short term oriented, so that revocation issues can be avoided. This also makes the export issue with Acquirer's certificates less of an issue.

Infrastructure and Certification for Electronic Commerce

The following discussion describes the details of the certification and infrastructure for electronic commerce on the internet or other public networks:

The Certification Hierarchy

The invention uses a number of hierarchies that are administered by the card associations or their affiliates. It is necessary that the card associations (brand names) are (or administer) the roots of these hierarchies. There are separate hierarchies for issuing bank, merchant, and consumer certificates. Credit card processors also receive certificates that are equivalent to bank certificates.

Example

This following example illustrates how the system herein works in conjunction with MasterCard certification services. The interface between the MasterCard certificate and various buyer and merchant software is described later in this document.

Certificate Trust and Formats for Different Entities

The different certificates issued to the different entities actually carry different meanings that are explained here:

The consumer certificate (21; FIG. 1) is a signed message that verifies the right of the person named in the certificate to use an account. Note that there is no particular need to validate the authenticity of the name of the consumer as long as some appropriate evidence of the right to use the account is presented. The signing authority can request information such as billing address and mothers maiden name to verify such evidence.

The merchant certificate. (22; FIG. 1) is an identity based certificate that assures the right of the Merchant to use the supplied name for business.

The certificate is usually issued by the acquiring bank that signed up the Merchant.

The acquirer certificate (23; FIG. 1) is a special purpose certificate that is provided to the merchants and consumers to communicate securely with the acquiring bank and to verify signatures by the bank. The acquiring bank may also receive a certificate issuing key if the acquirer is approved for issuing certificates for merchants.

All certificates are encoded, for example as x.509 v3 formatted certificates with the corresponding extensions.

Buyer/Card Holder Certificate

The consumer certificate consists of the following fields. A consumer generally receives multiple certificates, each associated with a particular account. The same key pair may be used in conjunction with more than one account.

Name, includes the following sections:

Requester name, bank association name, issuing authority name, and an account ID which can be represented by Hash (account number, randomizing factor, billing address, mother's maiden name (optional));

Starting date for the validity of the certificate;

Ending date for the validity of the certificate;

Certificate serial number;

Signature of the issuing authority;

Public key for signatures/key exchange;

Certificate type, for example signature only;

Certificate authority policy ID, for example URL for policy location.

Merchant Certificate

The merchant certificate consists of the following fields. A merchant can obtain more than one certificate, one for each acquirer. A merchant with multiple physical locations should generate a different key pair for each location. All merchant certificates are directly issued by the acquiring bank or the authority that the acquiring bank designates to issue merchant certificates:

Name, which includes the following sections:
Business or merchant name and address, Card association name, certification authority name, merchant-acquirer unique ID.

Starting date for the validity of the certificate;

Ending date for the validity of the certificate;

Certificate serial number;

Signature of the issuing authority;

Merchant capabilities;

Type of certificate;

Certification policy ID;

Public key for signatures/key exchange.

The merchant would then require different certificates from different acquirers if the merchant chooses to do business with multiple acquirers.

Acquirer Certificate(s)

The acquirer possesses one or more certificates that perform the functions of financial transactions (PI message encryption), as well as signature operations for authentication responses. The acquirer's financial certificate consists of the following fields. The acquiring bank generally obtains several certificates. A discussion of this is provided herein in connection with the description of availability of the payment services:

Name which includes the following:
Bank or processor name and address, card association name, acquirer unique number, certification authority name.
Starting date for the validity of the certificate;
Ending date for the validity of the certificate;
Certificate serial number;
Signature of the issuing authority;
Certification Policy ID;
Type of certificate;
Public key.

It is recommended that the acquirer possess one or more financial certificates, as well a different signature certificate. The financial certificate is communicated to Merchants and Card holders for encryption of the PI messages. T avoid supporting revocation services for the financial certificates, it is recommended that the financial certificate be valid for a short period of time, e.g. on the order of 1 day-1 week, with automatic renewal. The card holders and merchants then do not have to check for a revocation status. The signature certificate, however, is issued to be valid for long periods of time for Merchants to verify signatures on authentication responses.

Sign-Up Processes

To establish the infrastructure needed for the electronic payment system to function, all entities should sign-up with the appropriate service and obtain the appropriate certificate from the certification authority.

Card Holder Sign-Up

The consumer performs the following steps to sign-up with the service:

The consumer invokes a URL to access the financial certification services. The consumer receives a form describing the available account types for this service and then chooses the account type for which they wish to create a certificate. A form is downloaded from the certification service with the fields needed for the chosen account type. The card holder then fills in the necessary fields, generates the key pair and submits the form to the certification authority. The certificate is installed in the client application upon receipt of the approved signed certificate.

Merchant Sign-Up

The merchant performs the following steps to sign-up as a merchant in the electronic commerce space:

A merchant is signed up with an acquiring bank. In general, a contractual relationship is written between the merchant and the bank detailing the services supported by the bank. For example, a merchant may obtain authentication services only or authentication and clearing services. The exact rate charged by the payment service is also covered in the contract.

In case the acquiring bank is also a certification issuing authority, the merchant produces the appropriate business practice papers and obtains a certificate from the bank. Otherwise, the merchant obtains the certificate from the issuing authority designated by the acquiring bank. Each branch or location of the merchant obtains a certificate (optionally) in the same manner discussed above. The certificate signing request includes then the branch name and location.

Acquirer Sign-Up

The acquirer has different options as to how to enter the electronic commerce space. The first option is to obtain the capability to sign-up merchants, while the second option only allows an acquirer to process payments. In any case, the acquirer generally is acquiring merchants, and providing acquirer certificate(s) to the merchants.

An acquiring bank signs up using the following procedure:

A key pair of the appropriate length is generated, where more than one certificate is needed for the acquirer. In particular a financial certificate for key exchange and a signature certificate are needed. The acquirer's official representative should appear in person with the necessary papers at a certification authority approved by the card associations. Proof of business and other official papers is typically required. The certification authority generates the appropriate certificate. An acquirer signature certificate may be given certification authority capability if appropriate.

Expired Keys

If a key expires, a renewal is needed for continuation of service. A new CSR is submitted to the same address used previously for obtaining a certificate to get a new certificate. The two certificate are allowed to overlap in validity periods for one day in order to avoid problems with different time zones. A new key may be required for a new certificate depending on the policy set by the certification authority.

Compromised Keys

A compromised key needs special attention as a special case for a revocation reason. The time of revocation is an important factor to take into consideration in verifying signatures or validity of account numbers. A buyer's compromised key should be dealt with as a stolen credit card. A compromised merchant's key should be reported to the certification authority and the appropriate acquirer to get a newly issued certificate, and register the compromised key as invalid for further transactions. The compromised merchant key is listed in a CRL maintained by the acquirer for verification of the validity of the merchant.

A compromised acquirer key (for signatures only) is to be treated very carefully. Such an event has specific policy statements by the acquirer or the card association for recovery. The same applies for a compromised CA key.

Revoked Keys

A certificate can be revoked by the certificate owner, by the bank with the associated account, or by the authority that signed the certificate. A card holder can revoke their own certificate under the following conditions:

The consumer would like to close a certain account;
The consumer or merchant learned or suspects that their key is compromised.

A merchant can revoke their own certificate in the following circumstances:

A merchant is closing a certain branch or getting out of business. This is kept in a list at the acquirer for checking the merchant key validity.

A bank may revoke a card holder's certificate for the following reasons:

An account is over charged or does not have enough funds and should be suspended. A new certificate is issued if the account condition is improved.

A bank can revoke a merchant's certificate under the following conditions:

The merchant has been conducting unapproved business.
A revoked merchant certificate is added to a CRL maintained by the acquirer for checking the validity of the merchant. The user does not need access to the CRL because the payment cannot be approved without the acquirer's approval.

Consumers may also choose to obtain a CRL or check the revocation status of a merchant's certificate under any condition defined by the card associations.

Payment Service Availability Issues

The general design of the system supports multiple locations for the acquiring gateway. As a general rule, for security reasons, the same key pair should never be used by multiple Locations or by multiple machines. Therefore, a merchant needs to use some method of deciding which acquirer certificate to use.

Which Acquirer Certificate Should the Merchant Supply to the Customer?

The merchant obtains an acquirer certificate on a regular basis for use with card holder transactions, which is referred to as the financial certificate within this document. This certificate has a short term validity period to avoid revocation issues. This certificate is sent to the card holder as part of the Offer message described above. Note that this condition dictates that the merchant certificate is not in any way bound to the acquirer's financial certificate or key.

Resolution of Down Service Condition at a Specific Location

It is expected that an acquirer has multiple gateways for availability and load sharing reasons. These gateways may not have the same public/private key pairs and thus, the merchant may need to obtain several acquirer financial keys for different locations. If one of the acquirer gateways experiences some down time, the merchant should be able to select an acquirer key for a functional gateway within a short time frame.

Distribution of Certificates

Communicating Merchant Certificates to Customers

A merchant certificate is communicated to the consumer or the acquirer as part of the signature. An alternative is to supply the merchant certificate in the authentication portion of establishing the secure transport and communicate the certificate to the applications layer of the merchant software.

Acquirer Certificates Distribution Issues

The Acquirer's financial certificate (short term) is communicated to the merchant's every time they are renewed, for example at the beginning of every business day or week. These certificates are then communicated to the buyers as part of the Offer. The merchant chooses the appropriate acquirer certificate to submit to the buyer depending on the rules. Acquirers' signature certificates are communicated to the merchants using the same mechanism described above for communicating the merchant's certificate.

Distributing Buyers' Certificates

The buyers certificates are distributed in the same manner as the merchant's certificate described above.

The Interface to On-line Certification Service

The following discussion describes the mechanics of providing certification services for a World Wide Web client. There are two extensions that are presently preferred for the Buyer's Navigator to support user key and certificate generation and installation. The implementation implies that a WWW client (Navigator) software includes a link to a page that lists the approved CAs and their URL locations. An access to such a URL presents the user with choices of certificate types supported by the specific CA. A form is then downloaded to the client for the user to input the necessary fields, generate the public/private key pair and submit the certification request to the CA.

The following subsections provide some details for a WWW client to support on-line certification services:

Key Generation

An HTML tag facilitates generation of key material, and submission of the public key as part of an HTML form. The new tag is:

KEYGEN NAME="name

The KEYGEN tag is only valid within an HTML form. It causes the client user interface to provide for the selection of the key size for the user. The UI for the selection may be, for example a menu or radio buttons. The Navigator may present several possible key sizes. Currently the preferred export version only allows a 512 bit key, while the preferred US version gives the user the option of a 512 bit, 768 bit, and 1024 bit key. A longer key size for export versions for use in signature operations only (no key exchange) may provided.

When the submit button is pressed in the client software, a key pair of the selected size is generated. The private key is encrypted and stored in the local key database. The public key is extracted, DER encoded, and base 64 (RFC1113) encoded. The key data is DER encoded as a PACS #1 RSAPublicKey. This may be changed to SubjectPublicKey-Info as described in PKCS#7. Finally, the form data is submitted to the server. The public key data is submitted as a name/value pair, where the name is name as specified by the NAME=attribute of the KEYGEN tag, and the value is the base64 encoded public key.

The following is an example form submission as it would be delivered to a cgi program by the http server:

```
commonname = John + Doe & email = nobody@company.com
 & org = Free + Enterprise + Corporation & state = CA &
 country = US & key = MEgCQQCk%2FxYvGcZlD%2BBcbdn
 BRzGAYyKkaLjj8ov6vjkH4B17Pkr3GY3A%2BXH%2FLPr%0
 Apa46qBD9hJYqjNMa3gxhPpTuC3TdAgMBAAE%3D
```

Certificate Downloading

Support for a new MIME Content-Type has been added to the Navigator to facilitate downloading of user certificates. The new content type is referred to as "application/x-x509-user-cert". The content of the document is preferably a binary DER encoded X509 certificate. The default 8-bit encoding is used. X.509 certificate formats is supported, with the attributes described in this document.

Cryptography in Secure Courier

Cryptographic techniques are used throughout the document to provide privacy, authentication, and integrity functions necessary to meet the business requirements for electronic commerce. Details describing the card holder merchant connections as well as the merchant—acquirer connection are as follows:

The Card Holder—Merchant connection.

The general communications channel between the card holder and the merchant can be protected under a general security mechanism. However, the financial information and the confidential information communicated need to be further protected. The PI message is encrypted as a digital envelope under the acquirer public key to protect account information from the merchant.

The Merchant—Acquirer Connection

A secure authenticated channel is provided for all communications between the Merchant and the Acquirer Gateway to secure all messages exchanged. This channel uses DES for bulk data encryption with RSA keys for public key and key exchange operations. Other algorithms can be used The Payment Instruction (PI) Message The PI message is handled differently from all the other messages in the Secure Courier system herein described.

This message is composed of the hash of the account information, the hash of the offer information, and other date and miscellaneous data. The message is enveloped using a public key envelope and a DES symmetric key. The Card holder then signs the entire message and sends it to the merchant. This method satisfies the export rules for cryptographic software and is available for use world wide.

Other Buyer—Merchant Messages

The other messages communicated between the buyer and the merchant are encrypted using the secure transport mechanism discussed above if required by the merchant or the buyer. The merchant and buyer can determine interactively whether a specific transaction needs privacy for the order information, in which case a mechanism is established during the shopping/negotiation process. The same mechanism can then be used for the order messages exchanged between the buyer and the merchant.

Digital Signatures

Signatures are used in secure courier to provide evidence of the authorship of a message and non-repudiation for use at a later time by the appropriate party. The card holder provides a signature in the PI message, the merchant provides a signature in the offer message and in the receipt message to the card holder. The acquirer only signs the Authentication Response message to the merchant. Note that the acquirer signature is not sent back to the card holder because acquiring banks generally want to hide their identity from buyers.

Algorithms and Key Sizes Used in the Secure Courier

The specification of the above protocol does not identify the particular algorithms used. The following discussion presents the preferred algorithms and key sizes to be used for secure courier to satisfy financial and export requirements. This information is specific to the preferred embodiment and may change in the future according to standardization efforts in cryptographic algorithms and secure levels of keys sizes, as well as export rules.

Public Key Algorithms

The RSA public key algorithm is used for all public key operations and certificates, with the following key sizes:

2048 bits for the root keys for Certification authorities;

1024 bits for all signature only certificates;

768 bits for acquirers' key exchange certificates;

512 bits for merchants and buyers' key exchange certificates.

Symmetric Key Algorithms

DES is used for all bulk data encryption in the secure courier, including the PI message, as well as all messages between the Merchant and the Acquirer. The channel between the buyer and the merchant can use any available algorithm to encrypt data other than the PI. For domestic installations, RC4 with 128 bits key is used normally for efficiency reasons. For export purposes, RC4 with 40 bits key is used. Other algorithms may be available for export into specific countries under various export regulations.

Message Digest (Hashing) Algorithms

The secure courier uses MD5 for all hash functions, including hash computations for signature purposes. The only exception is MD2 for certifications requests because the PEM format specific to Certificate Signing Requests (CSR) uses MD2.

Message Formats in Secure Courier

The following discussion describes the messages that are used in the Secure Courier Electronic Payment Protocol in detail. The protocol defines a set of messages that may be sent between the parties of a transaction. Many of these messages come in pairs, quite often in a Request/Response or Query/Response kind of relationship. Each message is made up of basic data types. These types are commonly grouped items, such as amount and currency, or are items that are related in some way, such as payment instruction information.

The following subsections describe the individual messages of the Secure Courier protocol. Following the message definitions, a section is included that defines the subtypes that are used within the Secure Courier protocol:

Format

The description of the messages in this document uses an ASN.1 notation. This notation is not a complete ASN.1 specification, but is intended to be complete enough that the resulting data types, ordering, and the resulting encoding is completely specified. Many of the types may have additional restrictions, such as requiring an all-numeric field, where ASN.1 only specifies IA5 or Printable string types.

To achieve interoperability, both the content and the particular encoding of the messages is specified. While ASN.1 indicates the content of the messages, it does not actually specify the particular bits that are transmitted. It is possible to transmit each of these messages using any encoding scheme that is desired. Some possible choices for this are BER, as specified in the standard associated with ASN.1; a form of ISO 8583, where particular message data is assigned to fields; a packed encoding (PER); or some other newly devised method. It is presently preferred to use DER for encoding these messages. By specifying and encoding that is tied to the ASN.1 notation, one avoids having to define the encoding rules explicitly. The ASN.1 specification serves both as content list and encoding specification. It is presently preferred to use the PACS #7 specification for representing the enveloped data in Secure Courier messages. The ASN.1 syntax is also used in the PACS #7 specification for enveloped and signed data. By using ASN.1 to define the Secure Courier messages, it is possible to use one format to describe the entire contents of a Secure Courier message.

Parties to the Transaction

The Secure Courier Electronic Payment Protocol operates between three parties to a purchase transaction. The Merchant is offering goods or services for sale on the Internet. The Buyer receives the goods or services, paying the Merchant by presenting information about a credit card or debit card account. The Merchant will use this information to collect funds for the transaction through the services of an Acquirer.

Payment Instruction (PI)

The payment instruction is not a message in the true sense because it is never sent by itself between parties of the transaction. However, it is central to the operation of the Secure Courier protocol, motivating the contents of many of the other messages. For this reason it is described first.

Purpose

The Secure Courier Payment Instruction represents authorization by the Buyer to charge the appropriate account for the goods and services delivered. The payment instruction is also designed to provide the following security features:

Hide the account number from the Merchant.

Because account numbers are useful for transactions outside of this payment protocol, it is beneficial to reveal it only where required. This has a desirable effect of hiding the account numbers from any attacker that may obtain access to the Merchant's system.

Tie the payment authorization to a particular transaction.

The Payment Instruction contains data that indicate the precise agreement between the Merchant and the Buyer. By issuing the Slip, the Buyer indicates agreement to the transaction. By using it for payment, the Merchant also agrees to the contents of the transaction.

Prevent overcharging for a particular transaction.

The Payment Instruction contains a maximum monetary amount that is authorized for the transaction.

The Merchant is allowed to request sums up to the indicated amount from the Acquirer. The Merchant may do this in one request, or in several requests made over time as goods are delivered. The Acquirer may deny requests for funds beyond the limit specified. In any case, amounts beyond the limit are subject to dispute by the Buyer.

Provide a time-limit for charging.

The Payment Instruction contains an expiration time, after which the Acquirer may no longer allow the Merchant to charge the account. In any case, amounts charged to the account after the expiration date are subject to dispute by the Buyer.

Provide Purchase Instruction tracking information for use by the Acquirer.

The Acquirer may require that the Merchant provided a unique identifier for each Payment Instruction that is presented for deposit. A field is provided to verify the Merchant's identification of the data.

Provide an optional signature by the Buyer.

The signature (if present) may be used by the Acquirer or the Merchant to prove the identity and participation of the Buyer in the transaction.

Contents

```
PaymentInstruction ::= SEQUENCE {
    version      INTEGER,              -- version of the slip
    currentDate  UTCTime,              -- date of agreement
    expireDate   UTCTime,              -- expiration date
    totalAmount  FormattedMoney,       -- agreed total amount
    orderHash    DigestedData,         -- hash of description
    meracqHash   DigestedData,         -- Merchant/Acquirer
    bankcard     CardInfo              -- credit/debit card
}
``` currentDate is the time that the Payment Instruction was created. This value is used for tracking purposes. It is not used as an active input to the protocol.

expireDate is the time at which the Payment Instruction expires. This field may be checked by the Acquirer and the transaction rejected if the slip is submitted by the Merchant past this date.

totalAmount is the maximum total charges that the Merchant may make against this Payment Instruction. This field contains both a currency (in ISO 4217 format) and a units field. The units field is a formatted monetary value, including a currency symbol and decimal separator as appropriate. The choice of currency symbol and separator should match those in general use for the ISO 4217 currency indicated.

orderHash is the result of a message digest function applied to a description of the transaction. The field is a PACS #7 DigestedData type, which includes an algorithm identifier. The description itself need not be stored in the contentInfo portion of the PACS structure, although there is no harm including it, but is assumed to be a description of the order that was agreed upon by the Buyer and the Merchant.

meracqHash is a hash of the data that is exchanged between the Merchant and the Acquirer with this Purchase Instruction. The nature of this data is unknown to the Buyer, but may include a unique identifier for the Slip that is used by the Acquirer to prevent multiple use by the Merchant.

bankcard contains information about the Buyer's credit or debit card. This includes the card number itself (PAN) and several required or optional fields for authenticating the cardholder.

Notes

The formatted value is used in totalAmount because the Buyers' software displays the value for approval before including it in the Payment Instruction. Displaying a raw numeric string is not considered user-friendly, so the protocol requires that the Buyer approve the value that is stored in the Payment Instruction. The formatted value is checked and converted by the Acquirer when the Payment Instruction is opened.

The meracqHash field is implemented as a digest, rather than the original data, for two reasons:

A portion of the data exchanged between the Merchant and the Acquirer may be sensitive. For example, the identifier assigned to the Merchant may be useful in other contexts, and so should be kept private to the parties involved.

A future change in the protocol may require additional data. By using a digest value here, the format of the Payment Instruction is isolated from changes of this sort, and the Buyer's software does not need to be changed.

The Buyer cannot validate the data represented by these fields in any case, so there is no loss in the capability of the Buyer.

Purchase Request Message

The Secure Courier payment protocol begins after the Buyer has found one or more goods or services that are purchased from the Merchant. The Buyer begins the payment protocol by transmitting a Purchase Request message to the Merchant. This message continues the shopping or negotiation portion of the transaction, and also lays the groundwork for payment when an agreement is made.

Purpose

The Purchase Request message indicates that the Buyer believes that the list of goods and services is complete, and that all information required to describe the transaction has been transmitted to the Merchant. Note that the Purchase Request message itself may include portions of the data necessary to describe the order or it may refer to data previously sent.

The information that may be required includes:

Item List (Including Quantities)

The Buyer may also include prices in this message. Prices indicated by the Buyer are those that were in effect when the item was placed in the shopping basket. If prices have changed a new price may be displayed for the Buyer, and the Purchase Request should be resubmitted with the new price.

Shipping Destination

This data is used to compute the required local taxes and the charges for shipping and handling.

Transmitting the Purchase Request indicates that the Merchant should send any data that are required for the Buyer to generate an appropriate Payment Instruction for this transaction. The Buyer must also have transmitted any data that the Merchant requires to begin the payment protocol. This data may be present in the Purchase Request message itself, or may have been transmitted previously.

This data required by the Merchant may include:

Payment Method

For example, American Express, MasterCard, Visa, and debit card. These data are used to choose a credit card processing method, and may influence the choice of an Acquirer and the financial certificate associated with it. The merchant may also choose to adjust pricing based on the payment method. Note that this is not the credit card number, but only an indication of the payment method that is used.

Contents

The contents of this message are not defined by the payment protocol. The format may be any agreed upon by the Buyer and Merchant including, for example HTML and PEM. At a minimum, the message must include a session number that the merchant may use to retrieve data previously transmitted. At most, it may include all the data necessary to describe the transaction.

Generating Purchase Request

The Buyer follows the following steps when generating Purchase Request:

Gather all appropriate data, including reference numbers for previously sent data. Format message as appropriate for the protocol in use.

Processing Purchase Request

The Merchant follows the following steps when receiving Purchase Request:

Determine whether all appropriate data have been received from the Buyer. Resume negotiations (shopping) if data is missing or outdated. Verify that data are correct. This includes checking fields such as session numbers, item identifiers, and prices for correct format and values. Resume negotiations if data is incorrect. Generate Offer Message.

Errors

If the Merchant fails to receive the Purchase Request message, no Offer Message or other response is generated. The protocol may be terminated at this point. The merchant may remove any state information associated with this activity after an appropriate period of time.

If the Purchase Request message is received from the Buyer after the Merchant has removed or invalidated the associated state information, the Merchant may generate a message indicating the failure, and the protocol is terminated.

If the Merchant receives the Purchase Request a second time, it should generate a new Offer message, assuming other checks on the data succeed. The merchant may optionally generate exactly the same Offer message, or a completely new message.

Offer Message

The Secure Courier Offer message is sent from the Merchant to the Buyer in response to the Purchase Request.

Purpose

The Offer message has three purposes:

Present the final description of the transaction to the Buyer for approval and for inclusion in the Payment Instruction.

Provide a reference number for this transaction in case an error occurs during the remainder of the protocol.

Transmit additional data necessary for the Buyer to generate a Payment Instruction for the transaction.

The Merchant has the option to sign this message.

Contents

The Secure Courier payment protocol does not specify the entire content of the Offer message. The following ASN.1 definition gives a general outline of the contents that may be present in this message.

```
Offer ::= SET {
    [1] orderDesc      Order,
    [2] orderRef       OrderReference,    -- for future inquiry
```

```
                                                    -continued
    [3] totalAmount    FormattedMoney,
    [4] expireDate     UTCTime,
    [5] meracqHash     DigestData,         -- PACS #7 type
    [6] acquirer       AcquirerInfo,
    [7] merState       OrderState,
    [8] signature      DatedSig            -- signature w/ date
}
```

One implementation of this message is as an HTML document. Each component of the message is sent as a tagged portion of the document, or as a tag option.

The Offer message includes:

orderDesc is the description of the transaction. This is the contract that is agreed to between the Buyer and the Merchant. As such, it should include a list of items, quantities, and prices. It should also include the shipping method and address, along with any shipping charges and applicable taxes. For subscription services, the description, includes the type Of service and the time period covered. This data is in a Buyer-readable format. orderDesc is included in the Payment Instruction as a digest to tie the payment with the description.

orderRef is a unique number assigned by the Merchant. It is required to generate the Purchase Order message and is used to inquire about the state of the order if an error occurs during the transaction.

meracqHash is a digest of several fields that are sent by the Merchant to the Acquirer. This field is used to construct the Payment Instruction.

totalAmount is the maximum amount of money that the Merchant is allowed to collect for goods and services in this transaction. The client software uses this value to construct a Payment Instruction that is included in the Purchase Order message. This field includes both the currency and the units. The currency portion uses the ISO 4217 definitions for the currency. The units field is a character string contain the amount formatted for the currency used in the purchase. The string is formatted this way so that it may be easily displayed to the Buyer.

expireDate is the last time that charges should be made against the Buyer's account for this transaction. This value is included in the Payment Instruction so that it may be checked by the Acquirer.

acquirer is information about the Acquirer selected by the Merchant. This information is required by the Buyer to enveloped the Purchase Instruction data. This field contains a certificate, identifying the Acquirer and its associated public key.

merState data is private to the shopping protocol. Its contents are not defined by the payment protocol, but are returned to the Merchant in the following Purchase Order message. This data may include such things as Order Number. The content of this data may depend on whether state information is maintained by the Merchant system during the shopping protocol. For example, it may be necessary to include the Shipping Address information here, so that the Buyer can send it again with the Purchase Order message. These data are generally in a Merchant-readable format, and is probably opaque to the Buyer.

Order type

Order::=OCTET STRING

Order is what the Buyer's software should display as the ORDER. This is also the data that are used as input to the hash function to compute H(ORDER). It is possible to save this information in the navigator. This allows the Buyer to show what data were displayed at the time the purchase was made. This is possible by saving the HTML source page in a file, although a method that used mailboxes or folders is more user-friendly. Note that this value is different than OrderState and OrderNum. This is because the Order type is intended to be readable by humans.

If the OrderNum and OrderState fields do not correspond to the Order, there may be a dispute when the product is delivered. In this case, the Buyer should be able to show the saved Order information, and if it matches H(ORDER), show that it was what they thought was being offered. This field is not returned to the merchant.

OrderState Type

The OrderState component allows the merchant to recalculate the exact contents and pricing of an order.

```
OrderState ::= SEQUENCE {
   OrderNum,
   Item List        OPTIONAL,
   ShippingInfo     OPTIONAL
}
```

OrderNum represents a key for a record that is kept by the merchant. This record contains the actual purchase information, and is used to check the status of an order, e.g. through another HTML access. If the merchant is keeping its own state, then this record may contain the list of items and the shipping information required for generating the order. In this case, the following fields need not be provided.

ItemList contains the items purchased. This is currently transmitted to the Merchant in a token generated by the merchant and sent encrypted (may be also signed) to the client for further references to the transaction.

ShippingInfo is the delivery address, and is used for delivery, shipping cost calculations, and tax calculations. This field was sent in a previous form, prior to the OFFER, and is here only as a pass-through to keep the merchant from having to save state. It is preferably stored in a special, undisplayed forms field.

Generating Offer

The Merchant performs the following steps when generating the Offer message:

Create the Order information for the Buyer and OrderState to be returned with the Purchase Order. Generate an Order Reference number for the purchase. This identifier is valid for a certain period of time and must be distinct from all other Order References. Select an acquirer to use for this transaction. The selection may depend on the proposed payment method indicated by the Buyer. Once this selection is made it cannot be changed because the buyer uses the acquirer's public key to envelope private bankcard information.

Compute an appropriate total amount for this transaction. For hard-goods purchases this should be the total amount of the order, including exact amounts or allowances for taxes and shipping charges. For subscriptions or other similar purchases, this should be pre-authorized amount agreed upon by the Buyer and the Merchant.

Generate an expiration date for the transaction. For hard-goods, this should allow for a reasonable delivery time. For subscriptions, the expiration time might correspond roughly with the subscription period. Generate the OrderState and Order information for the Buyer. Generate a unique identifier TxID which is used to identify the Purchase Instruction that is received from the Buyer. Compute the digest function of the merchant's ID and TxID. This result is called meracqHash.

Record orderRef, TxID,

Optionally, generate a signature on the entire contents of the message

Processing the Offer

The Buyer performs the following steps when receiving the Offer message:

Review the Order information. Compute the message digest of the Order giving orderHash. Check the Acquirer's certificate. The certificate should belong to a trusted banking entity. The certificate for financial institutions that the Buyer trusts are signed by a certifying authority and may have special attributes that indicate that it belongs to an Acquirer, for example the signer of an acquirer's certificate should be a recognized card brand name, e.g. Master Card or VISA.

Review the totalAmount and expireDate fields. The Buyer should agree that they are reasonable. In the case of hard-goods, they should correspond with the total purchase price. If all terms are acceptable, generate a Payment Slip using totalAmount, expireDate, meracqHash, orderHash, the current time, and envelope it using the Acquirer's certificate. Generate and send a Purchase Order Message to the Merchant.

The Buyer may wish to save the entire Offer message for future reference. This allows the Buyer to retrieve the description of the order in the event that the purchase does not complete as expected. The Buyer should save at least to orderRef field for use in error recovery.

Errors

If the Buyer does not receive the Offer message, the Purchase Request message may be resubmitted, or the protocol may be terminated. The Buyer may always choose to terminate the protocol without responding to the Offer message.

Purchase Order Message

The Secure Courier Purchase Order message is sent by the Buyer to the Merchant in response to the Offer message.

Purpose

The PurchaseOrder message indicates that the Buyer has accepted the offer given by the Merchant. The message contains Secure Courier electronic payment information along with order information required by the shopping software.

Contents

```
PurchaseOrder ::= SET {
   [0] merState     OrderState,                    – from Offer mesg.
   [1] addedData    OrderData     OPTIONAL,        – additional data
   [2] eSlip        EnvelopedData                  – PACS #7 type
   [3] signature    DatedSig      OPTIONAL         – signature w/ date
}
``` merState includes all the information necessary for the Merchant to reconstruct the order. For protocols that do not maintain any state in the merchant at this stage, merState must include all of the previously provided data. If the merchant has maintained some state, then merState may simply be an order number (OrderRef). This field is completely uninterpreted by the Buyer's software.

Other information needed here may include:

Item list. A list of all items and quantities included in the order.

Shipping Address (or other delivery indicator)—to recompute the taxes

Shipping Method—to recompute the shipping charges addedData is additional data computed by the Buyer that may be need by the Merchant to complete the transaction. It is useful to include the OrderHash value here. This allows the merchant to check that its reconstruction of the Offer matches what was sent to the Buyer. Another use of this field is to include salt data that the Buyer used for computing the OrderHash field. The Merchant must also use this data so that the result matches what the Buyer put in the Payment Instruction.

Eslip is a Payment Instruction that has been enveloped with the public key of the Acquirer. In this way the payment information, specifically the credit card number and PIN, cannot be seen by the Merchant. In addition, there is no way for the Merchant to modify the meracqHash and orderHash fields that are stored there.

signature is a public key signature in PACS #7 signData format. The signature is computed on the enveloped Payment Instruction (Eslip).

Generating the Purchase Order

The Buyer performs the following steps to generate a Purchase Order:

Create a Payment Instruction from data provided in the Offer message. Copy the orderState field from the Offer message into the Purchase Order. Optionally create a signature on the Payment Instruction field.

Processing the Purchase Order

The Merchant performs the following steps when receiving a Purchase Order:

Errors

If the Merchant fails to receive the Purchase Order no further processing occurs. The merchant may delete any state information that it maintains about the transaction after a reasonable time. However, the orderRef value should never be given to any other transaction.

If the Merchant receives the Purchase Order after it has deleted any state information for it, it should indicate an error. This error should be signed by the Merchant if possible to indicate that it did not accept the Purchase Order, and does not use the Payment Instruction that was included in it.

If the Merchant receives the Purchase Order a second time, it should regenerate the original response to the Buyer (Purchase Receipt message).

Secure Courier Message Wrapper

All messages in the Secure Courier protocol between the Merchant and the Acquirer are contained in a message wrapper.. This allows the program reading the message from the communications channel to determine the type of the message, and take the appropriate response. This also serves as a second layer of an application layer firewall for protecting the Merchant-Acquirer channel.

Contents

```
SEPMessage ::= SEQUENCE {
    version     Version,
    route       RouteInfo,
    msgID       MessageType,
    message     ANY DEFINED BY msgId,
    digest      DigestedData           -- PACS #7 type
}
``` version indicates the Secure Courier protocol version number that is being used. This field is set to 0 in this version of the protocol.

route is provided for use by the Merchant's software. It identifies the originator of the message. Response messages copy the routing information from the request so that it can be correctly returned to the original location.

msgID indicates which of the messages in the following sections is present.

message contains one of the messages in the following sections.

digest is used to provide message integrity. The hash is computed on the entire contents of the version, route, msgID and message fields.

AuthRequest Message

The AuthRequest message is sent from the Merchant to the Acquirer.

Purpose

Allows the Merchant to request authorization to collect all or a portion of the transaction amount from the Buyer. As a special case, a request for no money requests the Acquirer to validate the Payment Instruction and the Buyer's account data.

Contents

```
AuthRequest ::= SEQUENCE {
    authAmount      Money,              -- 0 to validate only
    merchant        MerchantInfo,
    transaction     TxID,
    totalAmount     FormattedMoney,
    expireDate      UTCTime,
    orderHash       OrderHash,
    pmtmethod       PaymentMethod,
    payment         Eslip,
    batchseq        BatchSequence       OPTIONAL,
    invoice         STRING              OPTIONAL,
}
``` authAmount is the amount of money that the Merchant is requesting. This may be only a portion of the total amount authorized by the Buyer for this transaction.

merchant includes any data necessary to identify the Merchant to the Acquirer.

transaction is the TxID value that was generated to identify the Payment Instruction.

totalAmount is the value that the Merchant believes is included in the Payment Instruction.

expireDate is the value that the Merchant believes is included in the Payment Instruction.

orderHash is the digest if the Order description and should match what is in the Payment Instruction.

payment is the enveloped (and possibly signed) Payment Instruction from the Buyer.

batchseq and invoice are optional fields that the Acquire may record for tracking purposes.

Generating the AuthRequest

The Merchant performs the following steps to generate an AuthRequest message:

Gather together the TxID, totalAmount, expireDate, and OrderHash corresponding to the transaction. Determine the desired amount to be authorized. Determine tracking information (batchseq and invoice). Generate request including the Payment Instruction from the Buyer.

Processing the AuthRequest

The AuthRequest is received by the Acquirer. Check the merchant for validity and access. Verify that the transaction has not been used and that the expireDate has not passed. Compute the digest of the Merchant ID and TxID for comparing with meracqHash.

Decrypt the Payment Instruction. Verify that the meracqHash and OrderHash in the PaymentSlip match the values supplied by the Merchant. Verify that totalAmount and expireDate in the Payment Slip match the values supplied by the Merchant. Verify that the amount requested by the Merchant does not exceed the remaining value of the Payment Instruction. Authorize the transaction through the financial network. Generate the AuthResponse Message and send to Merchant.

Errors

If the AuthRequest Message fails to reach the Acquirer, no response is generated or an error may be generated by the network or application. The Merchant should resend the request. If the Acquirer receives a duplicate AuthRequest message, it should resend the original response.

AuthResponse Message

Purpose The AuthResponse message is the message returned from the bank network to the merchant in response to an AuthRequest message.

Contents

```
AuthResponse ::= SEQUENCE {
    response        StatusCode,
    data            AuthData
}
AuthData            type
AuthData ::= SEQUENCE {
    code            AuthCode,
    psd             PaymentServiceData,
    avs             AddressVerificationCode OPTIONAL
}
AuthCode            type
AuthCode ::= STRING size(6)
PaymentServerData type
PaymentServiceData ::= STRING size(23)
AddressVerificationCode type
AddressVerificationCode ::= STRING size(1..5)
Generating the AuthResponse Message
Processing the AuthResponse Message
```

Notes

It may be difficult to perform a combined form of Auth/Capture. While this would be efficient from a message point of view, it may be difficult to recover if the AuthResponse is lost before it is completely processed by the Merchant software. If the payment is already captured, the Merchant software needs some way of querying the Acquirer to see if the capture had occurred.

Purchase Confirmation Message

The Purchase Confirmation message is sent from the Merchant to the Buyer.

Purpose

Content

The content of this message is not specified by the Secure Courier protocol. However it should give some indication as to whether the transaction completed successfully. If the Buyer fails to receive this message, the status of the transaction is in doubt from his point of view. There should be some method of determining the correct outcome.

PurchaseConf::=OCTET STRING

Generating Purchase Confirmation

The Merchant must should save the results of the order until the time ????

Processing Purchase Confirmation

Errors

If the Buyer fails to receive the Purchase Confirmation, it cannot make any assumptions about the outcome of the transaction. Two options are available:

The Buyer can resubmit the Purchase Order. This option is valid for as long as the Merchant is willing to accept the order. The Merchant either resends the Purchase Confirmation if the order was already processed, or redoes the entire order process if the original Purchase Order had not been received.

The Buyer can query the Merchant for the results of the transaction. To do this the Buyer must have saved the OrderRef field that was sent in the Offer message.

Capture Message

Purpose

Contents

```
Capture ::= SEQUENCE {
    amount          Money,
    merchant        MerchantInfo,
    batseq          BatchSequence,
    authamount      Money,
    eslip           ESlip,
    authData        AuthData,
    authdate        UTCTime
}
```
Generating the Capture
Processing the Capture
Capture Response Message
```
CaptureResponse ::= SEQUENCE {
    response        StatusCode
}
```
Open Batch Message
```
BatchOpen ::= SEQUENCE {
    merchant        MerchantInfo
}
```
Open Batch Response Message
```
OpenBatchResponse ::= SEQUENCE {
    response        StatusCode,
    batch           BatchID
}
```
Close Batch Message
```
BatchClose ::= SEQUENCE {
    merchant        MerchantInfo,
    batchID         BatchID,
    invoice         STRING OPTIONAL,
    salestotal      Money,
    salescount      INTEGER,
    credittotal     Money,
    creditcount     INTEGER
}
```
Close Batch Response Message
```
CloseBatchResponse ::= SEQUENCE {
    response        StatusCode
}
```

Query Batch Message

NOTE: This is an optional message. Acquirers are not required to support this message. The Query Batch Message is sent from the Merchant to the Acquirer. It allows the Merchant system to access the current balance for the open batch.

```
QueryBatch ::= SEQUENCE {
    merchant        MerchantInfo
    batchID         BatchID              OPTIONAL
}
```
Batch Status Message
The Batch Message is sent in response to the Query Batch message.
```
BatchStatus ::= SEQUENCE {
    response        StatusCode,
    batchID         BatchID,
    balance         Money
}
```
Secure Courier Types
ESlip               type
ESlip ::= ContentInfo                    -- from PACS #7
```

The ESlip is expected to contain PACS #7 envelopedData. The content of the packet is a Payment Slip.

```
Money               type
Money ::= SEQUENCE {
    units           String size(12),
    currency        String size(3)       -- ISO 4217 values
}
```

The amount field is expressed in the currency specified in the following currency field. If a minor unit of currency applies, then amounts are expressed in the minor unit. (See ISO 8583, Sec. 4.3.11). The size (12 characters) comes from the current definition of this field in the ISO 8583 spec.

The currency field is defined by ISO 4217. The message handling code may check this field for valid contents. The ISO 8583 document indicates that this is a three character alpha or a three character numeric field.

Note that this type allows monetary values up to 12 digits in length. This a maximum value specified by the payment protocol. Individual acquirers may put lower limits on the values that may be provided in the authorization and capture calls, and may support lower limits on balances as well.

MerchantInfo Type

```
MerchantInfo ::= SEQUENCE {
    Merchant_id     STRING size(1..20)
    terminal_id     STRING size(1..20)
}
```

TxId Type

The TxId type includes data that identifies a particular transaction for a particular merchant. A transaction ID may be used only once.

```
TxID ::= INTEGER
CardInfo        type
CardInfo ::= SEQUENCE {
    PAN         String size(9..19),
    expDate     String size(4),      -- MMYY format
    IMPLICIT [0]  AVSInfo             OPTIONAL,
    IMPLICIT [1]  PIN                 OPTIONAL
}
```

This type contains the information about the bankcard that is used for the purchase. All of this information is provided by the Buyer in preparation for sending the PurchaseOrder message.

Notes

The PAN field as defined is large enough only for a normal credit card number. DEBIT card numbers are typically longer. ISO 8583 provides for another field to hold the rest of the DEBIT card account number.

AVSInfo Type

The AVSInfo type provides the necessary data for performing address verification of a credit card. This is one of the possible forms of authentication.

```
AVSInfo ::= SEQUENCE {
    street      String size(0..40),
    zipcode     String size(0..9)
}
```

PIN Type

```
PIN ::= OCTET STRING size(8)     -- 64 bits.
or
PIN ::= ContentInfo              -- PACS encrypted
```

The PIN is the personal identification number as entered by the buyer. ISO 8583 defines it as a 64-bit field. This data may be either the PIN itself or some derivative, presumably an encoded version.

Issues

If the PIN is encrypted the key used is preferably provided in the AcquirerInfo type. For the presently preferred embodiment of the invention, the PIN (if present) is in the clear, with the entire Slip enveloped with the Acquirer's public key.

AcquirerInfo Type

```
AcquirerInfo ::= SEQUENCE {
    Certificate         -- X.509 Certificate
}
```

Notes

If desired, the invention may be adapted for use with various enveloping and signature protocols. This allows the Buyer to choose the algorithms appropriate for the particular acquirer.

BatchSequence

```
BatchSequence ::= SEQUENCE {
    batch       BatchID,
    sequence    NumericString size(0..10)
}
BatchID         type
BatchID ::= NumericString size(0..10)
StatusCode      type
StatusCode ::= INTEGER
RouteInfo       type
RouteInfo ::= OCTET STRING size(8)
DatedSig        type
DatedSig ::= SEQUENCE {
    signedDate  UTCTime,
    nonce       OCTET STRING size(8),
    signature   SignedData        -- PACS #7 type
}
```

Notes

The signature field does not contain the data being signed. The signature represented by a DatedSig is on data found elsewhere. The signature field is computed on that data, along with signedDate and nonce.

The Acquirer Gateway Design Guidelines

The following discussion outlines some guidelines for designing and operating Internet Acquirer gateways.

Signing Up Acquirers

An Acquirer is signed up by the card associations, MasterCard and VISA for example. An acquirer should present all the necessary information to the Certification authority managed by the specific card association. This process is typically done in person, while other processes may be done in an on-line manner for efficiency reasons.

Merchant Registration and Certification Functions of the Acquirer

The acquirer is responsible for registering and issuing certificates for the merchants. In this role, the acquirer receives the business papers from a merchant and performs the necessary checks to ensure the validity of the merchant. The following items are given to each merchant from the acquirer:

- An acquirer merchant ID (MID) number, this number is unique for each acquirer—Merchant pair. A merchant may sign-up with more than one acquirer, in which case an MID is issued to the merchant by each acquirer.
- A merchant certificate, including all the necessary items required for
- electronic commerce as discussed above. As part of this process, the relationship between the merchant and each merchant dictates the capabilities of the merchant as embedded in the merchant's certificate.
- Access to the acquirer financial certificate for the merchant to obtain regular updates of the financial certificate. Recall that the acquirer financial certificate is short lived and requires constant updates.

Functions of the Acquirer Gateway for the Payment Protocol

The responsibilities of the Acquirer gateway are discussed above. In short, the acquirer gateway provides an interface between the Acquiring bank and the Internet. It processes the Secure Courier messages on the Internet and maps them into the appropriate message format used by the acquirer. It is important to note that there exists today many different message formats supported by different acquirers and payment processors. The gateway should provide a modular method of supporting these formats in order to avoid changing the backend software in use by the acquirers.

The Web Client Interface and Detailed Design

The following discussion describes the interaction between the payment protocol and a World Wide Web client that provides the customer with access to the payment services as well as shopping and negotiations services. It is also possible for the Secure Courier mechanism to work using an small-type transport, for non-interactive users.

After the buyer has gone shopping and agrees to purchase some item(s), the merchant (via the server software with which the buyer is interacting), shall display a FORM which lists the item(s) being purchased and instructs the buyer to enter specific information about the method of payment. Via new HTML tags within the FORM, the merchant software can instruct the Navigator to create the Payment Instruction (PI). This PI is automatically created, encrypted, and returned to the merchant with the rest of the FORM fields when the buyer SUBMITs. The PI's encryption is performed at a higher level than that of the session itself, providing greater security for this particularly sensitive information. In addition, it is encrypted using the public key of the acquirer. Thus, the merchant can pass the PI along but cannot view or modify the content.

HTML Forms Additions

One embodiment of the invention adds two new html tags. They are:

<CERTIFICATE> ... </CERTIFICATE>

This new tag brackets an entire base64-encoded (X.509) certificate. The only attribute valid/useful with a CERTIFICATE tag is the NAME attribute, which is required for later reference. The Navigator parses the certificate and holds onto it while processing the rest of the document. The certificate is not displayed unless the user specifically asks, via document information or a display button, to see it; or a preference option is selected that instructs the Navigator to always display certificates it finds.

NOTE: This tag should be enclosed within the document's <HEAD>...</HEAD> tags. Most navigators accept the tag outside, but merchants should not depend on this when creating their documents.

The second new HTML tag is:

<PAYORDER NAME="text"ACQ_CERT="name"> ... </PAYORDER>

This is actually a special type of INPUT tag, and must occur within a FORM. All text bracketed by a PAYORDER tag is considered the order. This is a list of items being purchased, interspersed with HTML formatting tags. The entire content, including any HTML, is scanned and used in the creation of the hash of the order, which is sent in the PI. The first character included in the hash is the one immediately following the '>' of the opening <PAYORDER> tag; the final character is that immediately preceding the '<' of the closing </PAYORDER> tag. Because the form is generated at the Merchant server, the same content is used by the merchant to generate the order hash independently.

Two attributes are valid with the PAYORDER tag, and both must be given. The NAME attribute specifies the name to be paired with the PI value in the form submission. The ACQ_CERT attribute names a certificate previously specified with a CERTIFICATE tag. This certificate contains the public key that is used to encrypt the PI.

In addition to the new tags, two new attributes are preferably provided for input fields:

PAYINFO=value

The new PAYINFO attribute marks input fields that are members of the PI. Most of these fields must be provided by the buyer (card holder); a few are provided by the merchant and must not be modified by the buyer. In fact, except for the AMOUNT field, which must be shown to the buyer, the rest of the merchant-provided fields can be of the INPUT type HIDDEN, which prevents the Navigator from displaying them.

| Value | Description | Provided by |
|---|---|---|
| CCNAME | Credh card type | Buyer |
| CCNUMBER | Credit card number | Buyer |
| EXPMONTH | Month of expiration | Buyer |
| EXPYEAR | Year of expiration | Buyer |
| HOLDER | Name of cardholder | Buyer |
| BILLADDR | Billing address of cardholder | Buyer |
| AMOUNT | Total amount | Merchant |
| MID | Merchant id | Merchant |
| TxID | Transaction id | Merchant |

This information, along with the order hash, comprises the PI, and is encrypted using the public key of the acquirer, found in the certificate named in the PAYORDER attribute ACQ_CERT. This encryption provides that the merchant does not gain access to any of the buyer's credit card information. To inform the user that these fields are being treated differently, something about their display is made different, e.g. they have a key icon adjacent or a special background or border. In addition, there should be a way for the user, upon seeing this display, to ask for more detailed information about the security associated with each field or all the fields.

READONLY

This attribute may be included with any input field. It specifies that the value should be displayed to the user, but the user is not allowed to modify the value. To avoid confusion, the field has a different background than that of a normal input field. The READONLY background is preferably the same as the document's background.

When the form is submitted, all input fields marked with a PAYINFO attribute are gathered together. The value of the PAYINFO attribute determines where the field belongs in the payment protocol PI message. The order hash created when parsing the PAYORDER is included. If any necessary information is missing, the Navigator displays an error. The form response is not sent, or a standard error response is sent. Otherwise, the PI is encrypted using the public key from the acquirer's certificate, base64 encoded, and sent as a single value, paired with the NAME value of the PAYORDER tag, to the server with the form response. All other form inputs are submitted normally. The bulk cipher used to encrypt the PI is DES for export purposes. The DES key is encrypted under the acquirer's public key to form a digital envelope.

Receipts

Receipts should be to sent back with the reply from the submission. The merchant application provides the user with means for saving and reviewing purchase receipts through the forms supplied, using an email channel, if needed.

Example

Given a base64 encoded X.509 certificate.XXX

The order consists of:

---

1 pair of Mozilla boxer shorts (size M),
1 Netscape coffee mug, and
50 copies of the Netscape server.
Total amount of order: $400.00
    Credit Card Type:
    Credit Card Number:
Month of Expiration:    Year of Expiration:
Card Holder's Name:
Billing Address:

---

The use of standards in Electronic commerce.

The herein described electronic payment system includes the use of standard formats and protocols, as well as commonly used de facto standards whenever possible. The following standards are used in Secure Courier:

X.509 version 3 certificate formats. These formats are emerging industry standards that are being employed by various commercial and governmental entities to issue digital certificates to individuals and entities. The version 3 of the X.509 certificate format allows for several optional attributes that can be used to identify the certificate capabilities and properties. The use of a flexible general purpose format makes it possible for different subsystems to interoperate using the same certificates. This also allows for use of many available commercial products that can issue X.509 certificates in the financial market.

The Public Key Cryptographic Standards PACS cryptographic message formats. These have been endorsed by several industrial and academic entities and have been used in the majority of applications using cryptographic techniques.

DER encoding (ASN.1) for forming the basic messages to be hashed, encrypted, signed, or enveloped, ISO8583 is used for a variety of financial data types.

ISO4217 is used for formats of amount and currency types.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A system for implementing electronic commerce over a public network, comprising:

a secure transport layer including a channel security mechanism comprising a keyed message digest computation, wherein said secure transport layer supports data privacy and integrity for communications between any two network nodes, such that two secure channels are provided, where there is one channel between a customer and a merchant and another channel between said merchant and an acquirer gateway such that said merchant and said acquirer are authenticated to each other and to said customer; and a secure courier message for implementing an electronic payment protocol that provides at least any of signature, non-repudiation, and secondary encryption terms wherein node-to-node authentication, privacy, and data integrity are automatically achieved by said secure transport layer.

2. The system of claim 1, wherein all channel communications between any two nodes in said system are encrypted.

3. The system of claim 1, wherein said customer is authenticated.

4. The system of claim 1, wherein each message is hashed to avoid early termination type attacks, and to assure that messages arrive at a recipient unaltered.

5. The system of claim 1, wherein confidential customer information is kept encrypted with regard to all parties, including a merchant that is handling a transaction.

6. The system of claim 1, wherein specific order information is maintained in confidence with regard to all parties other than said merchant.

7. The system of claim 1, wherein digital signatures are communicated between all parties to ensure authorship between two parties that are not necessarily communicating directly with each other.

8. The system of claim 1, wherein said secondary encryption term defines encryption of message data fields for decryption by a third party that is not necessarily a recipient of an entire message.

9. The system of claim 1, wherein each secure courier message has a message wrapper and a message body.

10. The system of claim 9, wherein the message wrapper consists of at least one or more of an order number, and routing information.

11. The system of claim 9, wherein for each message an acknowledge is generated by a recipient and sent to a sender to ensure receipt of the message.

12. The system of claim 11, wherein said acknowledge is a hash of said message that proves receipt by an appropriate recipient by using an SSL layer to guarantee an authenticated channel.

13. The system of claim 12, wherein time of receipt is concatenated to said hash and said concatenated message is used as an acknowledge.

14. The system of claim 1, wherein a message is considered to be expired if it is received after a message validity period is over; and wherein a denial is optionally provided instead of an acknowledge.

15. The system of claim 1, further comprising:

a customer application that implements browsing and shopping functions, as well as generating purchase orders, payment information (PI), and signatures for transactions.

16. The system of claim 15, wherein said customer application receives price and product information from said merchant and encrypts a transaction ID supplied from said merchant with a credit card number, where such information is made accessible to said acquirer only using an acquirer's public-key, which is extracted from an acquirer digital certificate.

17. The system of claim 15, wherein said customer application verifies signatures from said merchant to ensure origination of messages, such that an order as supplied in a receipt matches an original order generated by a customer earlier.

18. The system of claim 15, wherein said customer application generates signatures on payment messages using a public key certificate.

19. The system of claim 1, further comprising:

a merchant application for providing server functions for said customers to obtain product information and pricing.

20. The system of claim 19, wherein said merchant application generates a transaction ID for a customer order to track said order until it has been authorized by said acquirer, wherein said transaction IDs are generated sequentially and used only once.

21. The system of claim 19, wherein said merchant application verifies an acquirer signature on capture responses and a customer signature on receipts.

22. The system of claim 19, wherein said merchant application generates receipts for customer signature.

23. The system of claim 19, wherein said merchant application generates digests of order information for said acquirer to verify authenticity of a purchase order.

24. The system of claim 1, further comprising:
an acquirer application for receiving order amounts and transaction ID with customer financial information and for performing credit card authorizations.

25. The system of claim 24, wherein said acquirer application receives capture requests and performs capture confirmation.

26. The system of claim 24, wherein aid acquirer application translates a standard message format from said merchant into proper formats used by an existing authorization network.

27. The system of claim 1, wherein messages used in said payment protocol may include any of the following:
PAN: a personal account number for a customer card;
Expiration Date: an expiration date of said card;
Merchant ID: a unique number for each merchant assigned by said acquirer upon signing up said merchant, said merchant ID being unique for each acquirer, and including an acquirer ID as part of it to generate a globally unique number;
Transaction ID: a unique number assigned by said merchant for each transaction, wherein said merchant and said customer can use this number in conjunction with said merchant ID to identify any particular transaction;
Acquirer Certificate;
Merchant Certificate;
Total Amount;
H(Order);
PIN;
Billing address;
Shipping Address;
Resp-Code: a response code from an authentication process;
Auth-Code: a number returned by a banking network to use for clearing/capture steps;
CaptureResp: a response for a capture process;
Validity Period: start and expiration dates for a message;
Date: date and time stamp; and
Digital Signature: a digital signature comprising the following:
SIGNx(data)=Sx(data, nonce, date), nonce, date, signer's certificate.

28. The system of claim 1, wherein a transaction ID (TxID), in which said PI value is encrypted so that a merchant server does not have any clear credit card numbers that can be accessed remotely, is used to prevent a merchant from replaying authorization requests.

29. The system of claim 28, wherein said transaction ID (TxID) is combined with credit card information and encrypted in a PI message to ensure that each such message is different when the merchant uses a unique TxID for each transaction.

30. In an authorization group consisting of a customer, a merchant, and an acquirer, a transaction method comprising the steps of:
sending a purchase-order, payment Instruction (PI) message to a merchant; and
said merchant to responding with:
$S_M$(H(Purchase-Order, PI), Date, Time);
where:
H(value)=a message digest of value using a negotiated message digest algorithm.

31. The transaction method of claim 30, further comprising the step of:
assigning a transaction ID (TxID) used for book keeping purposes and optionally to prevent a merchant from replaying authorization requests.

32. The transaction method of claim 31, wherein said transaction ID TxID is combined with credit card information and encrypted in a PI message to ensure that each message is different if said Merchant uses a unique TxID for each transaction.

33. The transaction method of claim 30, wherein an offer from a merchant to a customer comprises the form:
SIGNM(Validity Period, Items, Payment Method, zip code or country (for shipping charges computation), Amount, Currency, Merchant ID (MID), Acquirer's certificate (CERTA), and transaction ID (TxID)).

34. The transaction method of claim 30, wherein a purchase order from a customer to a merchant comprises the form:
Name, Validity Period, Items, Total Amount, Currency, Merchant ID (MID), transaction ID (TxID), and shipping address.

35. The transaction method of claim 30, wherein a PI message is a signed message from said customer using a Slip having the form:
Version, current date, expiration date (Validity Period), Total Amount, Currency, Orderhash, MerAcqHash, Credit Card information (CardInfo);
where:
Order=Hash of an order description including any salt for minimizing attacks on said hash;
MerAcqhash=hash of a merchant ID, transaction ID, and other merchant or acquirer data specific to a merchant-acquirer pair and not needed by the customer other than for inclusion in a PI message;
CardInfo=(Personal account number (PAN, expiration date, other optional information that may be needed by a payment processor/acquirer.

36. The transaction method of claim 30, further comprising the steps of:
sending said PI encrypted to said acquirer using an acquirer's public key; and
encrypting said PI message using a following digital envelope construction as follows:

E(Slip)=PA{DES key K}, K(Slip);

such that a final message sent is formatted as follows:

PI=SINCE(E(Slip));

where:
K{value}=value encrypted under K using a symmetric-key algorithm;
Cx, CERTx=a certificate of entity x;
PKx{key}=key encrypted under a public key (PK) for x using a public-key algorithm, where x can be C for customer, M for Merchant or A for Acquirer;
E{value}=encryption of value under a data encryption key that is encrypted under a public key of a recipient and referred to as a digital envelope; and
Sx(Value)=a value combined with the digital signature of the entity x using its private key, such that if entity x does not have a public-private key-pair, then a low grade signature can be generated using a hash of a value with information from x.

* * * * *